United States Patent [19]
Bush

[11] Patent Number: 6,078,785
[45] Date of Patent: *Jun. 20, 2000

[54] DEMAND REPORTING OF ELECTRICITY CONSUMPTION BY RADIO IN RELAYS TO A BASE STATION, AND DEMAND RELAYS WATTMETERS SO REPORTING OVER A WIDE AREA

[76] Inventor: E. William Bush, 6389 La Jolla Scenic Dr. South, La Jolla, Calif. 92037

[*] Notice: This patent issued on a continued prosecution application filed under 37 CFR 1.53(d), and is subject to the twenty year patent term provisions of 35 U.S.C. 154(a)(2).

[21] Appl. No.: 08/731,299

[22] Filed: Oct. 15, 1996

Related U.S. Application Data

[60] Provisional application No. 60/005,297, Oct. 16, 1995.

[51] Int. Cl.⁷ ...................................................... H04B 7/14
[52] U.S. Cl. .............................. 455/7; 455/9; 340/870.02
[58] Field of Search ........................ 340/890.02, 870.03, 340/825.06, 10.1; 370/389, 392, 393; 455/7, 9, 13.1, 67.1, 445, 11.1, 412, 450, 446

[56] References Cited

U.S. PATENT DOCUMENTS

| | | | |
|---|---|---|---|
| 4,162,484 | 7/1979 | Abe et al. | 340/870.02 |
| 4,638,298 | 1/1987 | Spiro | 340/827 |
| 4,811,011 | 3/1989 | Sollinger | 340/870.02 |
| 5,032,833 | 7/1991 | Laporte | 340/825.06 |
| 5,067,147 | 11/1991 | Lee | 455/436 |
| 5,129,096 | 7/1992 | Burns | 455/9 |
| 5,150,114 | 9/1992 | Johansson | 340/870.03 |
| 5,353,283 | 10/1994 | Tsuchiya | 370/392 |
| 5,383,187 | 1/1995 | Vardakas et al. | 370/825.02 |
| 5,432,507 | 7/1995 | Mussino et al. | 340/870.03 |
| 5,438,329 | 8/1995 | Gastouniotis et al. | 340/870.03 |
| 5,452,304 | 9/1995 | Bjenne et al. | 370/392 |
| 5,495,239 | 2/1996 | Ouellette | 340/870.02 |
| 5,553,094 | 9/1996 | Johnson et al. | 340/870.03 |
| 5,682,422 | 10/1997 | Oliver | 370/870.02 |
| 5,748,104 | 5/1998 | Argyroudis et al. | 340/870.11 |

*Primary Examiner*—Nguyen Vo
*Attorney, Agent, or Firm*—Fuess & Davidenas

[57] ABSTRACT

A great number (typically over 1 million) radio-communicating monitors of electricity consumption (typically all-electronic computerized wattmeters) distributed over a large geographical area (typically over 4500 square miles) communicate over radio frequency band (typically V.H.F. band at a one of three different frequencies) to multiple (typically over 45) regional central stations. Communication both to and from distant monitors is multi-path multi-link radio through intervening monitors, commonly located each in an associated annular concentric ring centered about a regional central station. Individual monitors from 0 to typically 5.64 miles distance from regional central stations are individually interrogated of typically 25 bytes information in typically up to 5 relays both outgoing and incoming during a time interval of up to typically 9.78 seconds at data transfer rates of typically 6 kbaud/second. Some 1.2 million monitors, called "demand relay meters" can typically be read out in 55 hours. Any individual demand relay meter can be accessed for instantaneous electrical consumption, and well as a demand profile history, for load monitoring and for load-sensitive billing purposes.

10 Claims, 17 Drawing Sheets

| COMPANY | Model # | Price | Type | Year | Accuracy | Temp. | Load | Comm. | Class | Misc. | Form |
|---|---|---|---|---|---|---|---|---|---|---|---|
| Landis & Gyr | DXMS2S | $226 | | 1986 | +/-0.3% | | 0-30A | | 20 | | |
| Landis & Gyr | SSM-2 | | | 1991 | +/-0.3% | | | | 20/30 | | 12S,15S,16S |
| Jemtec | JEM 1 | $1500-$4000 | | 1974 | +/-0.14% | -30/+70C | | | | | |
| Jemtec | JEM 2 | $2050-$3650 | | | | -30/+70C | 15-25 | RS232 | 10/20 | 8 diget | |
| Jemtec | JEM 3 | $2350-$4900 | Demand | | +/-0.11% | -30/+70C | 0-10A | Modem | 10/20 | | |
| Nertec | TL101 | $160 | Demand | 1991 | +/-0.11% | -30/+70C | | Telephone | | | |
| ABB Power | E1R | $150 | Demand | 1994 | +/-0.11% | -30/+70C | | | 30/200 | | |
| ABB Power | Alpha | | Demand | | +/-0.11% | -30/+70C | | | 20/200 | | |
| Process Sys. | Quad 4 | $275 | Demand | | +/-0.11% | -30/+70C | | RS232 | 20 | | 5,6,8,9 |
| Schlumberger | Fulcrum | $900-$1700 | | | +/-0.11% | -30/+70C | | | | 75K RAM | |
| Schlumberger | Quantum | $2000-$3000 | | | | -30/+70C | | Telephone | | | |
| Schlumberger | Vecton | | | 1994 | +/-0.11% | -30/+70C | | | | | |
| Am. Innov. | | | AMR Module | | +/-0.11% | -30/+70C | | Telephone | | | |
| Metricom | 300C | $450 | Demand | 1991 | +/-0.11% | -30/+70C | | IR Port | | | |

TABLE 1 ELECTRONIC METERS

Fig. 5

| # | Description | Part Number | Manuf. | Dist. | REFERENCE DESIGNATOR | QUOTE QTY | Qty | EA | Cum | COMMENT |
|---|---|---|---|---|---|---|---|---|---|---|
| 1 | Lexan Cover | 5" dia. X 4" (1/8" wall) | Moldesign | | | | 1 | $0.850 | $0.85 | Have Quote |
| 2 | Marmon Clamp | | | | | | | | | Marmon clamp eliminated |
| 3 | Copper contacts | | | | | | 3 | $0.400 | $1.20 | Ron Only |
| 4 | Base Housing | 1/8 in. | Moldesign | | | | 1 | $1.200 | $1.20 | Have Quote |
| 5 | Misc. Hardware | Nuts, Bolts, Washers | | | | | 12 | $0.030 | $0.36 | Rom |
| 6 | P.C. Board | Commercial Grade | | | | | 1 | $0.350 | $0.35 | Extrapolated from commercial project |
| 7 | Resistors | 1/4 Watt, 5% | Carbon film | TTI | R1 THRU R28 | | 28 | $0.006 | $0.17 | Many will be eliminated with IC |
| 8 | Capacitors | NMC080C-JPO470J50 | | Daanco Inc. | C1 THRU C37 | | 37 | $0.019 | $0.70 | Many will be eliminated with IC |
| 9 | Output Transistor | 2N2222A | Motorola | TIME | Q1,Q2 | | 2 | $0.283 | $0.57 | Will be replaced by IC |
| 10 | Current Sensors | CS60-010 | Coil Craft | Coil Craft | | | 2 | | | Eliminated by floating power supply |
| 11 | Micro Processor | MC16C71-04P | Microchip | Insight | | | 1 | $3.430 | $3.43 | Motorola might have a better Micro. |
| 12 | EEPROM (1K) | MC93LC56SN | Microchip | Insight | | | 1 | $0.430 | $0.43 | Changed from 93C46 to 93C56 |
| 13 | Reset Control | DC1233-10 | Dallas | AVED Inc. | | | 1 | $0.670 | $0.67 | Safe Guard only |
| 14 | Receiver IC | MC13135 | Motorola | TIME | | | 1 | $2.330 | $2.33 | Compromise. There might be a better choice |
| 15 | UHF Transmitter | MC13176 | Motorola | TIME | | | 1 | $1.750 | $1.75 | Catalog shows $3.05ea at a qty of 48pcs. |
| 16 | R.F. Switch | MRF1C2003 | Motorola | TIME | | | 1 | $3.410 | $3.41 | Must explore diode cutout |
| 17 | DC/DC Converter | MAX610 | Maxim | | | | 1 | $0.480 | $0.48 | Used LM-317 quote |
| 18 | Filter, 1st IF (10.7MHz) | SFE-10.7MJ-10A | muRata | TIME | | | 1 | $0.320 | $0.32 | Will be replaced by IC. |
| 19 | Display (4 digit) | 3900-363-470 Reflective | Standish | Standish | | | 1 | $2.500 | $2.50 | Many to chose from. |
| 20 | Filter, 2nd IF (455KHz) | CFU455B2 | muRata | TIME | | | 1 | $0.800 | $0.80 | Will be replaced by IC. |
| 21 | Crystal (32.768 KHz) | R38-32.768 | Raltron | Kelex Elcl. | X1,X2,X3 | | 3 | $0.220 | $0.66 | Quantity will be reduced ultimately |
| 22 | Super Capacitor | FYOH224Z | NEC | BELL | | | 1 | $1.190 | $1.19 | Many to chose from. Needs further study. |
| 23 | Transistor | MPS5179 | Motorola | | Q4,Q3 | 5000 | 2 | $0.270 | $0.54 | Used catalog price, replace with IC |
| 24 | Transistor | NTE311 | | | Q5 | | 1 | $0.500 | $0.50 | ROM, replace with IC |
| 25 | Transistor | 3N4402 | Motorola | Q6 | | 2000 | 1 | $0.180 | $0.18 | Used catalog price (can be improved) |
| 26 | Potentiometer, Calibration | | | | R29 THRU R33 | | 4 | $0.250 | $1.00 | Will design to eliminate |
| 27 | Coils (Wire) | 12 in. enough for all | | | L1 THRU L7 | | 1 | $0.120 | $0.12 | ROM, will be eliminated with IC |
| | | | | TOTAL MATERIAL | | | | | $25.71 | |
| | | | | BURDEN & LABOR | | | | | $3.86 | This factor includes labor. |
| | | | | TOTAL COST | | | | | $29.56 | |
| | | | | PROFIT | | | | | $4.43 | Initially with is conservative |
| | | | | TOTAL | | | | | $34.00 | |

TABLE 2  BILL OF MATERIALS

Fig. 6

| UTILITY[1] | Population | METERS | READ COST | COMMERCIAL | THEFT | LOAD MGT |
|---|---|---|---|---|---|---|
| 1. Central Maine Power Maine, Allan Ladd 207-623-3527-2361 | 750,000 | 500,000 62% | $0.65/read | over 400kwhr/mon | "No Problem" | 10% water heater disconnect |
| 2. Mississippi Power, Mississippi, Bryan Seal 601-484-2668 | 515,000 | 182,000 | $0.50 to $0.60/read | 200 to 300 over 5 mwhr | Mainly residential 200 cases/year | Provides Chevron with customized billing data. |
| 3. Provo City Power, Utah, Monica Watkins 801-379-6810 | 93,000 | 29,000 31% | $0.42/read | BYU & Hospital only | Do not pursue Attorney discourages | Currently no load control program is in being. |
| 4. Florida Power & Light Florida, Carolyn Barda 305-552-4287 | 3,300,000 Customers | 3,500,000 | $0.30/read | 1% remote read DCSI System | Revenue Protection Dept. Actively pursuing theft | 330,000 on automatic load control. 10% of small ind. on curtailable rates. |
| 5. Public Service E & G, N.Y., Paramu, Charlie Brown, 207-430-8626 | 5,000,000 | 1.95m Elect 1.55m Gas 39% | $0.67/read E $1.01/read G | 8,000 provides 40% of income revenue | Have Theft dept.. Muli-million $ problem | Curtailable rate exists Volunteer A/C shut down. |
| 6. Wisconsin Elect Power Wisconsin, Dave Gorton 414-221-3876 | 2,000,000 | 950k Elect 250k Gas 39% | $0.50/read | 4000 comm. 15 min TOU recorded | 2 or 3 per week | 100,000 water heater 10-15 mhr customers have curtailable rates |
| 7. Central Illinois Power Illinois, Chicago, Bill Flemming 217-253-3374 | 35 towns | 7,900 Elect 15,130 Gas 48% | $0.49/read | Billing Cycle comm. 10 days resid. 21 days | Thefts found in 13 yr. 3 gas & 6 electric | 12 ea. curtailable rates customers. 1500 demand controller customers. |
| 8. Black Hills P & L So. Dakota, Aaron Eisenbraum 605-348-1700 | 80,000 | 54,000 68% | >>$0.50/read no data | 180 commercial annual audit for p.f. consultation | Rural area where policy is not to pursue theft | Customer installed recorders to reduce rates from $.06 to $.025 /kwhr. |
| 9. Central Power & Light Texas, Corpus Christy, Pat Patel 512-880-6814 | 2,000,000 | 560,000 28% | $0.67/read | 75,000 commercial 6,200 industrial with solid state recorders | Currently setting up a theft department within utility | Contracts with farmers to pump water at night.. Periodic checks made. |
| 10. Clark Public Util. Washington Janet Oster 206-699-3365 | 226,200 | 115,000 E 15,000 W | $.08/READ $.90/READ | 11 customers provided TOU data | Not a priority | Investigation in process. |
| 11. Arizona Public Service Arizona, Larry Clifton 602-371-7209 | 1,000,000 | 640,000 E | $0.50/READ | 100,000 TOU | 1% Gross Revenue (Justice Dept.) | TOU meters & attractive rate to manage |
| 12. SDG&E, California, Mark Howell, Darryl Murry 654-8733 | 2,000,000 | 1,200,000 60% | $0.50/read | 4500 kwhr/month | Estimated at 3/4% of gross revenue | A number of curtailable commercial customers |

TABLE 3  UTILITY SURVEY (repeat)

Fig. 8

TABLE 4  ATTENUATION FACTORS

| FACTOR | AT 150 MHz |
|---|---|
| AMBIENT NOISE DESENSITIZING | |
| CENTRAL URBAN-NEW YORK | -25 dB |
| URBAN AREA | -15 dB |
| SUBURBAN-RESIDENTIAL | -10 dB |
| RURAL | -2 dB |
| FOLIAGE LOSSES | |
| NO TREES | 0 |
| SPARSE TREES | 0 |
| MEDIUM DENSITY TREES | -3 dB |
| JUNGLE FOLIAGE | -7 dB |
| INSIDE BUILDINGS | |
| CENTRAL URBAN AREA BUILDINGS | -25 dB |
| MEDIUM COMMERCIAL BUILDINGS | -10 dB |
| SUBURBAN RESIDENCE | -3 dB |

Fig. 11

TABLE 5  THEORETICAL RANGE MARGIN

| PARAMETER | | NUMBER |
|---|---|---|
| TRANSMITTER POWER | 1 WATT | 0 DBW |
| PLANE EARTH ATTENUATION | | -108 dB |
| ANTENNA GAIN TRANSMITTER | | +2 dB |
| ANTENNA GAIN RECEIVER | | -6 dB |
| OBSTRUCTION ATTENUATION | | -20 dB |
| RECEIVED POWER | | -132 DBW |
| | | |
| NOISE POWER (KTB) | 300°, 6KHZ | -165 DBW |
| NOISE FIGURE | | +5 dB |
| PROCESSING GAIN | | -3 dB |
| REQUIRED SIGNAL TO NOISE RATIO | | +6 dB |
| RECEIVER THRESHOLD | | -157 DBW |
| | | |
| RANGE MARGIN | | 25 dB |

Fig. 12

|   | RING IDENTIFICATION | | | | | | | | | | DATA BYTES | TOTAL BYTES | SECONDS 0.001333 |
|---|---|---|---|---|---|---|---|---|---|---|---|---|---|
|   | A | B | C | D | E | D | C | B | A | I | | | |
| A message | 3 | 3 | 3 | 3 | 3 | 3 | 3 | 3 | 3 | 1 |  | 25 | 0.033333 |
| B message |   | 3 | 3 | 3 | 3 | 3 | 3 | 3 | 3 | 1 |  | 22 | 0.029333 |
| C message |   |   | 3 | 3 | 3 | 3 | 3 | 3 | 3 | 1 |  | 19 | 0.025333 |
| D message |   |   |   | 3 | 3 | 3 | 3 | 3 | 3 | 1 |  | 16 | 0.021333 |
| E message |   |   |   |   | 3 | 3 | 3 | 3 | 3 | 1 | 1444 | 1457 | 1.942667 |
| D message |   |   |   |   |   | 3 | 3 | 3 | 3 | 1 | 1444 | 1454 | 1.938667 |
| C message |   |   |   |   |   |   | 3 | 3 | 3 | 1 | 1444 | 1451 | 1.934667 |
| B message |   |   |   |   |   |   |   | 3 | 3 | 1 | 1444 | 1448 | 1.930667 |
| A message |   |   |   |   |   |   |   |   | 3 | 1 | 1444 | 1445 | 1.926667 |
|   |   |   |   |   |   |   |   |   |   |   |  | 7337 | 9.782667 |
| A message | 3 | 3 | 3 |   |   | 3 | 3 | 3 | 3 | 1 |  | 19 | 0.025333 |
| B message |   | 3 | 3 |   |   | 3 | 3 | 3 | 3 | 1 |  | 16 | 0.021333 |
| C message |   |   | 3 |   |   | 3 | 3 | 3 | 3 | 1 |  | 13 | 0.017333 |
| D message |   |   |   |   |   | 3 | 3 | 3 | 3 | 1 | 1444 | 1454 | 1.938667 |
| C message |   |   |   |   |   |   | 3 | 3 | 3 | 1 | 1444 | 1451 | 1.934667 |
| B message |   |   |   |   |   |   |   | 3 | 3 | 1 | 1444 | 1448 | 1.930667 |
| A message |   |   |   |   |   |   |   |   | 3 | 1 | 1444 | 1445 | 1.926667 |
|   |   |   |   |   |   |   |   |   |   |   |  | 5846 | 7.794667 |
| A message | 3 | 3 |   |   |   |   | 3 | 3 | 3 | 1 |  | 13 | 0.017333 |
| B message |   | 3 |   |   |   |   | 3 | 3 | 3 | 1 |  | 10 | 0.013333 |
| C message |   |   |   |   |   |   | 3 | 3 | 3 | 1 | 1444 | 1451 | 1.934667 |
| B message |   |   |   |   |   |   |   | 3 | 3 | 1 | 1444 | 1448 | 1.930667 |
| A message |   |   |   |   |   |   |   |   | 3 | 1 | 1444 | 1445 | 1.926667 |
|   |   |   |   |   |   |   |   |   |   |   |  | 4367 | 5.822667 |
| A message | 3 |   |   |   |   |   |   | 3 | 3 | 1 |  | 7 | 0.009333 |
| B message |   |   |   |   |   |   |   | 3 | 3 | 1 | 1444 | 1448 | 1.930667 |
| A message |   |   |   |   |   |   |   |   | 3 | 1 | 1444 | 1445 | 1.926667 |
|   |   |   |   |   |   |   |   |   |   |   |  | 2900 | 3.866667 |
| A message |   |   |   |   |   |   |   |   |   | 1 | 1444 | 1445 | 1.926667 |
|   |   |   |   |   |   |   |   |   |   |   |  | 1445 | 1.926667 |

TABLE 6

Fig 15

| RING | A | B | C | D | E | TOTALS |
|---|---|---|---|---|---|---|
| 1 BYTES PER READ (FROM INTERROG. CHART) | 1445 | 2900 | 4367 | 5846 | 7337 | |
| 2 SINGLE DRM READ (SEC. (8 BITS / 6 KHZ) | 1.927 | 3.867 | 5.823 | 7.795 | 9.783 | |
| 3 SECTORS / RING (ARBITRARILY ASSIGNED) | 3 | 6 | 12 | 24 | 48 | 93 |
| 4 AREA / RING (SQ. MI.) (100 SQ MI CIRCLE RADIUS / 5) | 4 | 12 | 20 | 28 | 36 | 100 |
| 5 AREA / SECTOR (SQ. MI.) (RING AREA / SECTORS) | 1.333 | 2.000 | 1.667 | 1.167 | 0.750 | |
| 6 DRM'S / SECTOR (SECTOR AREA*1.2M / 4500 SQ. MI.) | 356 | 533 | 444 | 311 | 200 | |
| 7 DRM'S / RING (RING AREA*1.2M / 4500) | 1,067 | 3,200 | 5,333 | 7,467 | 9,600 | 26,667 |
| 8 DRM'S / SERVICE AREA (45*DRM'S/RING) | 48,000 | 144,000 | 240,000 | 336,000 | 432,000 | 1,200,000 |
| 9 READ TIME (HOURS) (DRM'S/RING *DRM READ TIME/3600) | 0.57 | 3.44 | 8.63 | 16.17 | 26.09 | 54.89 |
| 10 READ TIME (DAYS) (READ TIME HOURS/24) | 0.02 | 0.14 | 0.36 | 0.67 | 1.09 | 2.29 |

TABLE 7

Fig. 16

PROTOCOL TEST RESULTS

| MODE | DATE | TIME (HRS) | BAND | FILE SIZE BITS | TRANSFER TIME |
|---|---|---|---|---|---|
| G-TOR | 3/14/94 | 4:00pm | 14.1 MHz | 9,718 | 4.3 min. |
| Next Best | 3/14/94 | 4:00pm | 14.1 MHz | 9,718 | 8.17 min. |
| G-TOR | 3/14/94 | 4:00pm | 14.1 MHz | 9.718 | 3.75 min. |
| Next Best | 3/14/94 | 4:00pm | 14.1 MHz | 9,718 | 9.53 min. |
| G-TOR | 3/15/94 | 4:00pm | 7.1 MHz | 3,269 | 1.58 min. |
| Next Best | 3/15/94 | 3:30pm | 7.1 MHz | 3,269 | 3.12 min. |
| G-TOR | 3/15/94 | 3:30pm | 7.1 MHz | 3,269 | 1.92 min. |
| Next Best | 3/15/94 | 3:30pm | 7.1 MHz | 3,269 | 2.58 min. |
| G-TOR | 3/15/94 | 3:30pm | 7.1 MHz | 3,269 | 1.17 min. |
| Next Best | 3/15/94 | 3:30pm | 7.1 MHz | 3,269 | 2.58 min. |

TABLE 8

Fig. 18

DEMAND REPORTING OF ELECTRICITY CONSUMPTION BY RADIO IN RELAYS TO A BASE STATION, AND DEMAND RELAYS WATTMETERS SO REPORTING OVER A WIDE AREA

RELATION TO RELATED PROVISIONAL, AND UTILITY, PATENT APPLICATIONS

The present patent application is related to and descended from U.S. provisional patent application Ser. No. 60/005, 297 filed on Oct. 16, 1995, for DEMAND REPORTING OF ELECTRICITY CONSUMPTION BY RADIO IN RELAYS TO A BASE STATION, AND DEMAND RELAY WATT-METERS SO REPORTING OVER A WIDE AREA to the same E. William Bush who is the inventor of the present application.

The present patent application is also related to a U.S. utility patent application Ser. No. 08/731,298 filed on Oct. 15, 1996, now abandoned for DEMAND-RELAY-REPORTING ELECTRONIC WATTMETER WITHOUT A CURRENT TRANSFORMER SENSOR to the selfsame inventor of the present patent application. The related utility patent application is also descended from a provisional patent application. The contents of the related utility patent application are incorporated herein by reference.

BACKGROUND OF THE INVENTION

1. Field of the Invention

The present invention generally concerns the demand reporting by each of a great multiplicity of electricity-using sites of (i) the instantaneous rate(s) of electricity usage (i.e., watts) at the site, and/or (ii) the total electricity usage during a period (i.e., watt-hours) by the site. The reporting is in response to radio requests from a central reporting station that may, according to the distance of the interrogated site, be relayed through each of a number of like sites.

The present invention also concerns demand-reporting radio-linked radio-relay-communicating electronic wattmeters that can be arrayed in great numbers over large areas so as to monitor and to report upon demand by radio instantaneous and/or historical electricity usage by homes and by businesses within the area.

2. Description of the Prior Art

2.1 General Requirement Circa 1990 for An Electronic Power Meter

U.S. electrical utilities have desired for some time power meter features and capabilities that the traditional electro-mechanical power meter cannot provide. However, these desires have not as of yet, circa 1995, been considered sufficient justification for a complete one-for-one replacement of existing residential power meters.

Without the market scale which would be dictated only by wholesale replacement of existing residential power meters, electronic meters have been relegated to niche markets. Now (circa 1995), however, electrical utilities face the new requirement of wheeling. With the advent of Wheeling, utilities are willing to consider a complete replacement of the existing electromechanical meters. It is desired that a more powerful electronic meter would be produced at a price comparable to, or less than, the existing electromechanical meter.

Utilities throughout the United States recognize that Wheeling is rapidly becoming a reality and the resulting competition will dictate the adoption and utilization of a new metering technology. Many new and interesting metering products are becoming available, but to date these products have targeted small niche markets. The price and longevity of the electromechanical meters have prevented direct competition for the large residential market. However, wheeling [defined and further discussed in the fourth paragraph hereinafter] now provides the opportunity to upset this long-standing impasse.

The requirements for electric utility metering in the United States are driven by the customer. There is a general concern for customer satisfaction in the utility industry which is being driven to some degree, circa 1995, by the prospect of wheeling. The specific areas where utilities are interested in improving their customer interface are in offering (i) variable rates for load management, (ii) direct load curtailment, (iii) time of use (TOU) information, (iv) security, and revenue protection, (v) reduced expenses in meter reading, and (vi) customer interactive communications.

At the present time there appear to be an abundance of reasons for the U.S. utility industry to anticipate changes and prepare to operate competitively in a significantly different business environment. Some of the factors that contribute to the changes are include: (i) the present and long term United States economics trend of expansion, (ii) wheeling, (iii) electric vehicles, and (iv) new technology.

Detailed discourse regarding the US economy is beyond the scope of this disclosure. However, U.S. electric utilities have been seriously affected in the past by varying interest rates. Power generation expansion that requires borrowed capital could put a utility at risk.

Wheeling became a reality when the Public Utility Regulatory Policies Act of 1978 (PURPA) amended the Federal Power Act and gave the Federal Energy Regulatory Commission (FERC) expanded responsibilities for the encouragement of co-generation and small power production using alternative energy technologies. See Electric Power Wheeling and Dealing, Technological Considerations for increasing Competition; Congress of the United States Office of Technology Assessment PP 55. The goals of PURPA were to advance: 1) conservation of electric energy, 2) increased efficiency in electric power production, and 3) achievement of equitable retail rates for consumers. This was advanced in large part by requiring utilities to interconnect with and buy power from co-generators and small power producers that met standards established by FERC. This was the first major Federal move to open up electricity markets to non-utilities.

There have been other amendments to the Act of 1978 and all the utilities that were contacted in our market survey are preparing for the added competition that the act allows. In this relative new competitive environment, the energy will be billed to the utility that can provide the best service at the lowest cost. Better service can be accomplished by: 1) instantaneous readouts for shut-offs, turn-ons, verification, etc. 2) TOU (time of use) profiles which will allow rate change allowances, 3) faster and more accurate billing and 4) demand load control. Finally, the lower cost will result from: 1) manual meter reading elimination, 2) load leveling, and 3) improved customer relations.

Another government mandate that is destined to impact the utility industry is electric vehicles. Air pollution has prompted the State of California to establish quotas for non-polluting (electric) vehicles in the Los Angeles area. Not only will the use of electric vehicles increase the need for electrical energy, but a new metering concept will be required. At least one utility is currently buying communications equipment so that each electric vehicle can have it's own individual power meter. This allows the utility company to appropriately charge the vehicle owner irrespective of where the vehicle batteries are recharged. The magnitude of the added energy usage requirement is clearly brought into perspective in realizing that the energy requirements for an electric vehicle would about parallel the usage of a typical residence.

It is interesting and important to note that the DRM system proposed here would exactly satisfy the electric vehicle metering requirements. A readout could be accomplished at any time when the vehicle is domiciled at a designated location. Alternatively a search and read program could be implemented to perform a readout anywhere in the utility service area.

A number of advancements in new technology can now provide the basis for a significantly different residential power meter. Microprocessors have been developed for large volume applications, particularly for the automotive industry, and RF integrated circuits have been developed for large volume application such as commercial radios, pagers and portable telephones. The large volume is the ingredient that dictates the economics, and these particular components are directly applicable to the power meter application.

2.1 Specific Objectives of a New Electronic Power Meter

An increased-capability electronic power meter should be provided at a price comparable to the existing residential electromechanical power meter. However, capabilities will be enhanced. The desired new capabilities include the following:

A new electronic power meter would desirably offer built-in two-way RF communications for automatic remote meter reading.

It would retain hourly time-of-use (TOU) measurements for 30 days. Alternatively, it would retain TOU measurements every 2½ minutes for 2 hours, A new electronic power meter would desirably offer record the time of, and send an alarm, at the onset of any tampering so as to help preclude energy theft.

It would desirably provide a remote display for customer communications.

Finally, a new electronic power meter would desirably provide output control for load curtailment.

The new electronic power meter should have an operational life of at least 15 years with a failure rate of less than 1% per year, an normally much, much less. Electronic devices can easily achieve this stringent operational requirement. A new electronic power meter would in particular be designed with proper derating and overall conservatism to guarantee the prescribed long life, target costs and performance.

SUMMARY OF THE INVENTION

The present invention contemplates a communications method and system where a network of a great number of geographically-distributed radio-communicating monitors of the use of electricity supports the reporting by radio to a central station, upon and responsively to successive demands originating from the central station, of such electricity usage as is monitored by each of the great number of monitors, (i) where radio communications with at least some of the monitors is multi-path through other monitors, (ii) where multiple central stations over a large geographic area may each successively interrogate associated monitors at the same time without interference, (iii) where failed multi-path radio communications to non-responding monitors are automatically re-routed, and (iv) where it is difficult to fraudulently emulate the legitimate reporting of a legitimate monitor for purpose of embezzling electricity.

1. Multi-Path Radio Communication With Geographically Distributed Monitors of Electricity Consumption In the preferred embodiment of the invention, each of a great number of geographically-distributed monitors each of which monitors a local use of electricity is assigned an identification. The identification is at least locally unique to a regional central station to which the monitor will report, and that is preferably universally unique. All monitors continuously listen to all radio traffic, but each monitor will respond only to its own unique identification when addressed by radio.

Each of the great number of geographically-distributed monitors is classified to be within a particular one geographical zone out of a number of such zones which, in succession by ones or by multiples in serial and/or in parallel, are all directly or indirectly contiguously connected both to one another and to a regional central station. The successive zones are preferably and typically in the substantial form of annular rings around an approximate center point where the regional central station is located; although this geometric partitionment need not invariably be the case.

The regional central station serves to address, in sequence and upon successive times, each of the great number of the geographically-distributed monitors. It does so by transmitting a demand message string that includes both (i) addresses and (ii) commands.

The demand message string first includes the unique address of each of any number of selected geographically intervening monitors as do, in total, provide a outward communications relay path from the central station to a terminus monitor. For example, if the terminus monitor is in an outer annular ring, an intervening monitor in each of those inner annular rings that are between the regional central station and the outer annular ring would be addressed. Each of these outward-relay-path monitors also receives an associated command, normally a single binary bit, informing it that it is simply an intervening monitor in the outward communications relay path and that, so being, it is not presently the terminus monitor. Each relay monitor preferably strips its own address from the demand message string as the demand message string is re-transmitted. This however is not invariably necessary, and each monitor could, for example, simply add indexing information to the demand message string indicating how far into the typically multiple outward path addresses of the demand message string relay communication had transpired.

The demand message string from the regional central station further includes the unique address of a one monitor that is presently the terminus monitor, plus a command to this monitor informing it that it is so presently the terminus monitor. The terminus monitor normally has a single predominant, default, response to being individually selectively addressed, and that response is to simply to re-transmit all the data of which it is presently possessed. It is, however, easily alternatively possible for the terminus monitor to receive commands directing it to do everything from selectively reporting only certain information to, in some embodiments, disconnecting electrical power to monitored facility. The terminus monitor preferably also strips its own address from the demand message string, re-transmitting the abbreviated demand message string in accompaniment to data.

The original, and now abbreviated, demand message string still further preferably included, and includes, the unique address of each of any number of selected geographically intervening monitors as do, in total, provide a reverse, inward, communications relay path from the terminus monitor back to the central station. For example, if the terminus monitor is in an outer annular ring, then those intervening monitors that are in each of those inner annular rings that are between the outer annular ring and the regional central station could be the same monitors that served as relays between the regional central station and the terminus monitor, or could alternatively be still other monitors. Again, the command portion of the demand message string informs each addressed inward-relay-path monitor that it is merely intervening in the inward communications relay path. Again, each monitor preferably strips its own address off the demand message string before retransmitting. The inbound data from the terminus monitor is simply re-transmitted.

Ultimately the regional central station will retrieve the data that its demand message string requested from the individually addressed terminus monitor through a succession of radio relays. This relay path is both outward from the central station through intervening monitors to the terminus monitor, and also inward from the terminus monitor back through intervening monitors to the central station.

By successive interrogations of each of the large number of monitors upon successive times, the central station may ultimately receive via radio information regarding the electricity usage as is monitored by all the large of geographically-distributed monitors.

2. A Regional Central Station Will Try Multiple Paths of Multi-Path Radio Communication to a Non-Communicating Monitor If a regional central station, having seat a demand message string, does not receive the expected response within the expected time interval (which can vary depending upon the number of re-transmissions, and links in the path), then multi-path radio communication has failed. The regional central station normally re-attempts communication though an alternative path either outbound, inbound, or both.

If communication remains "stuck", the regional central station can go to each intervening monitor—either outbound, inbound, or both—in turn to attempt to isolate why, and where, the communication link is failing. The preferred regional central station "learns" from communications histories, and uses paths proven most reliable.

3. Multiple Regional Central Stations Each Communication by Multi-Path Radio With Geographically Distributed Monitors of Electricity Consumption A large geographical area, such as a major metropolitan area, may have a number of regional central stations each of which collects information from a surrounding area. In accordance with the geometrical fact that hexagonal shaped tight-packed-contiguous areas on a grid surface may be color with only three different colors so that no two adjoining areas are of the same color, each regional central station communicates by radio with monitors within a roughly hexagonal geographical area (a hexagon being itself a rough, and tightly packed, version of a circle). The collective regional central stations, and all monitors associated with each, use three different radio frequencies so that the radio communications within any one area are non-interfering with the simultaneous radio communications within any adjacent area.

These and other aspects and attributes of the present invention will become increasingly clear upon reference to the following drawings and accompanying specification.

BRIEF DESCRIPTION OF THE DRAWINGS

FIG. 5 is a Table 1 of Electronic meters.

FIG. 6 is a Table 2 of an exemplary bill of material for a demand relay electronic meter.

FIG. 8 is a Table 3 of data from a survey of electric utilities.

FIG. 11 is a Table 4 of VHF radio propagation attenuation factors.

FIG. 12 is a Table 5 of the theoretical range margin over a one mile path of VHF radio propagation.

FIG. 15 is a Table 6 listing communications at interrogation time −1.

FIG. 16 is a Table 7 listing communications at interrogation time −2.

FIG. 18 is a Table 8 listing test results of the communications protocol of the system for the demand reporting of electricity consumption by radio in relays to a base station in accordance with the present invention.

DESCRIPTION OF THE PREFERRED EMBODIMENT

1. Overview of the System of the Present Invention

The Demand Relay Meter (DRM) system of the present invention will allow anyone connected to the computer network of an electric utility, and having the proper program access code, to immediately read any one of approximately 1.2 million meters in a 4500 square mile service area.

The electric utility controls and manages the entire system. No other communications system, network or company outside of the electric utility is involved.

Figure 1:
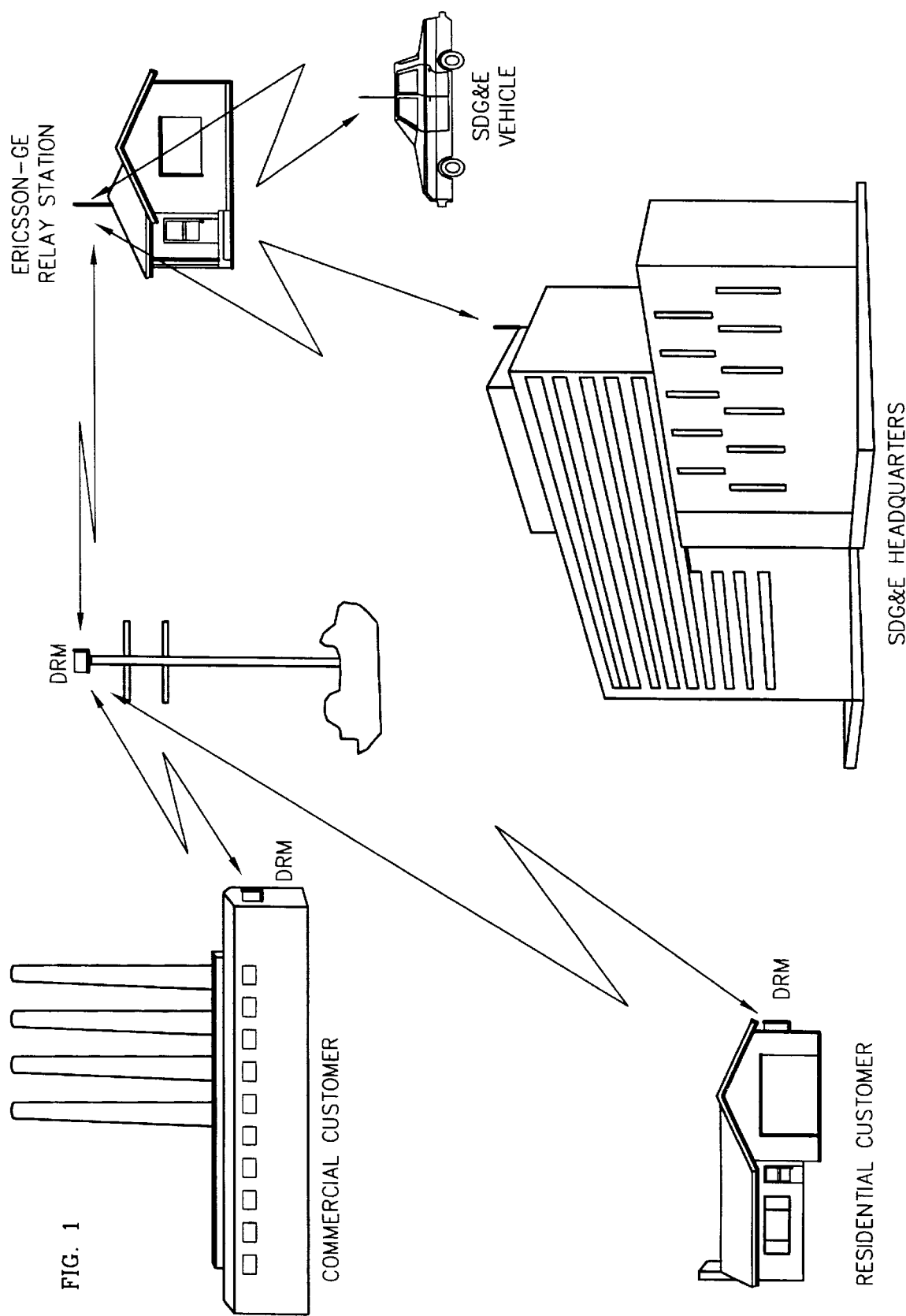
FIG. 1 is a diagrammatic representation of a system for the demand reporting of electricity consumption by radio in relays to a base station, and also of demand relay wattmeters so reporting over a wide area, in accordance with the present invention.

All data transfers from the Demand Relay Meter (DRM) to the electric utility headquarters are accomplished with the use of Radio Frequency (RF) communications. Part of the transfer utilizes an existing Ericsson-GE RF communications system, and the balance of the transfer uses a DRM transmission as shown in diagrammatic form in FIG. 1. Some electric utilities—such as, for example, San Diego Gas and Electric Company of San Diego, Calif., U.S.A.—already presently (circa 1995) own and operate the voice and data transmission system that is identified in FIG. 1 as ERICSSON-GE. This system currently provides voice communications throughout the service area. It utilizes UHF frequency allocation in the vicinity of 800 MHz. A number of relay stations are employed which are located at selected sites to provide robust, trouble free performance. This Ericsson-GE communications system will provide the data communication link from any office or mobile terminal with access to the communication system to any selected residential or industrial area. There, the digital data is demodulated to base band and then used to modulate a DRM transmitter. The DRM transmitter then proceeds to interrogate other DRMs, as requested, by the command received through the Ericsson-GE communications system.

In implementation of the system of the present invention, additional transceivers are added to the existing, baseline, Ericsson-GE system. These additional transceivers are described by Ericsson as "Node" transceivers. One Node unit is required for each 100 square mile area in a typical service area of 4500 square miles, for a total of 45 Node units. These node units sell for approximately $2,000 U.S. each, circa 1995.

An alternate approach to implementing the present system is to provide a higher power DRM transceiver at each of the existing Ericsson relay stations. A cost trade off analysis establishes the most cost effective approach for any particular implementation of the system of the present invention. The preferred DRM transceivers generally costs much less than $2,000, and its coverage at VHF is superior to that at UHF.

Figure 2:
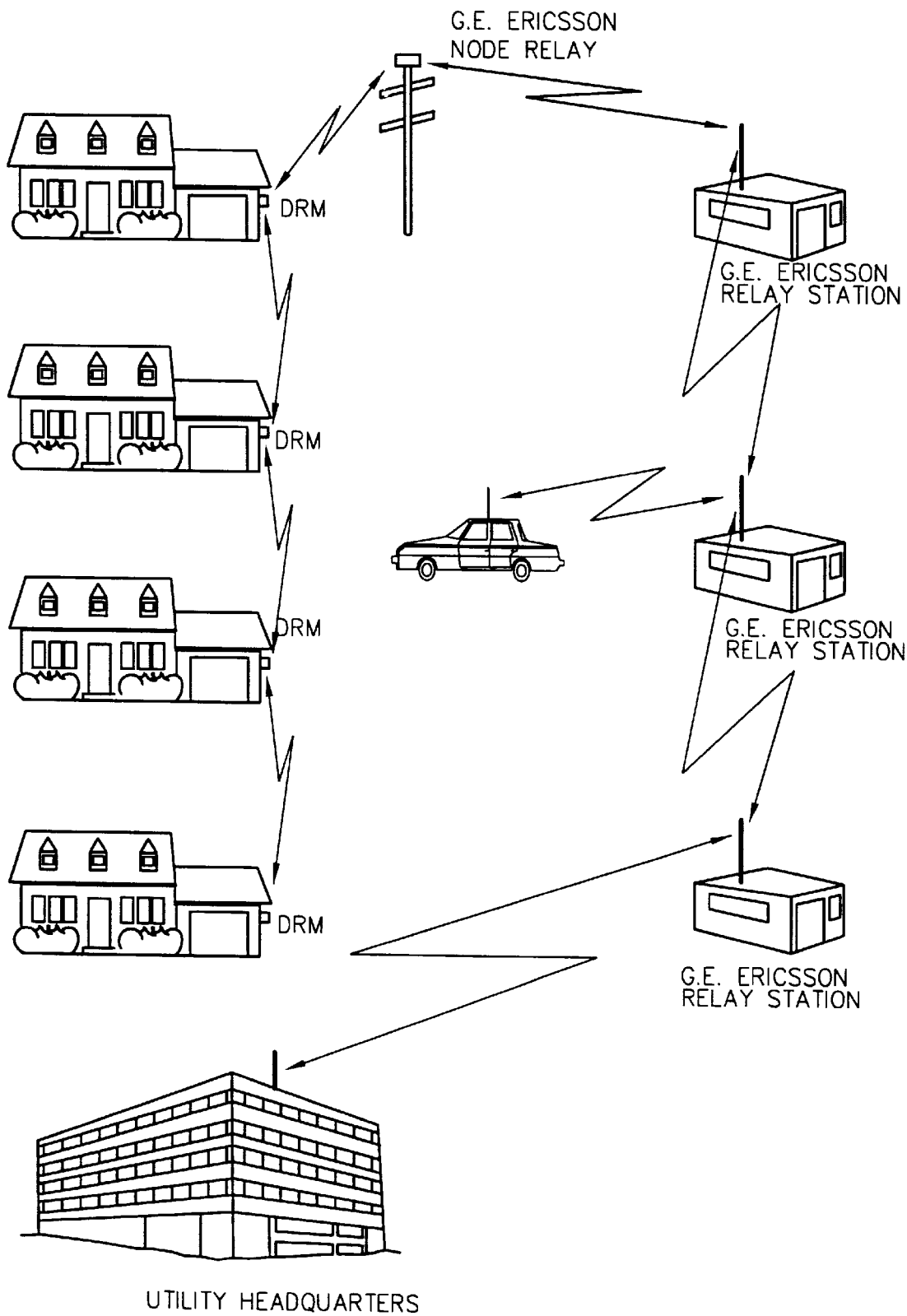
FIG. 2 is a diagrammatic representation showing how digital communications are accomplished from an Ericsson node transceiver to any given individual demand relay power meter.

FIG. 2 is another diagrammatic representation showing how digital communications in the system of the present invention are accomplished from an Ericsson Node transceiver to any given individual power meter. The DRM range capability is limited for a number of reasons: a) the antenna is small and integral to the meter itself, b) the DRM location is subject to shadow interference and attenuation, and c) the intended urban environment inherently has RF interference. To provide consistent and reliable data transfer in this environment, the DRM system is designed to be inherently flexble and adaptable. This adaptability is accomplished by serializing each and every DRM, and programming all the DRMs to have several different modes of operation. Any given DRM will, when interrogated, read out the recorded power readings or act as a relay and re-transmit the received message. FIG. 2 shows that the power reading from one residence is relayed through three other DRMs before it goes into the Ericsson Node unit.

Figure 3:
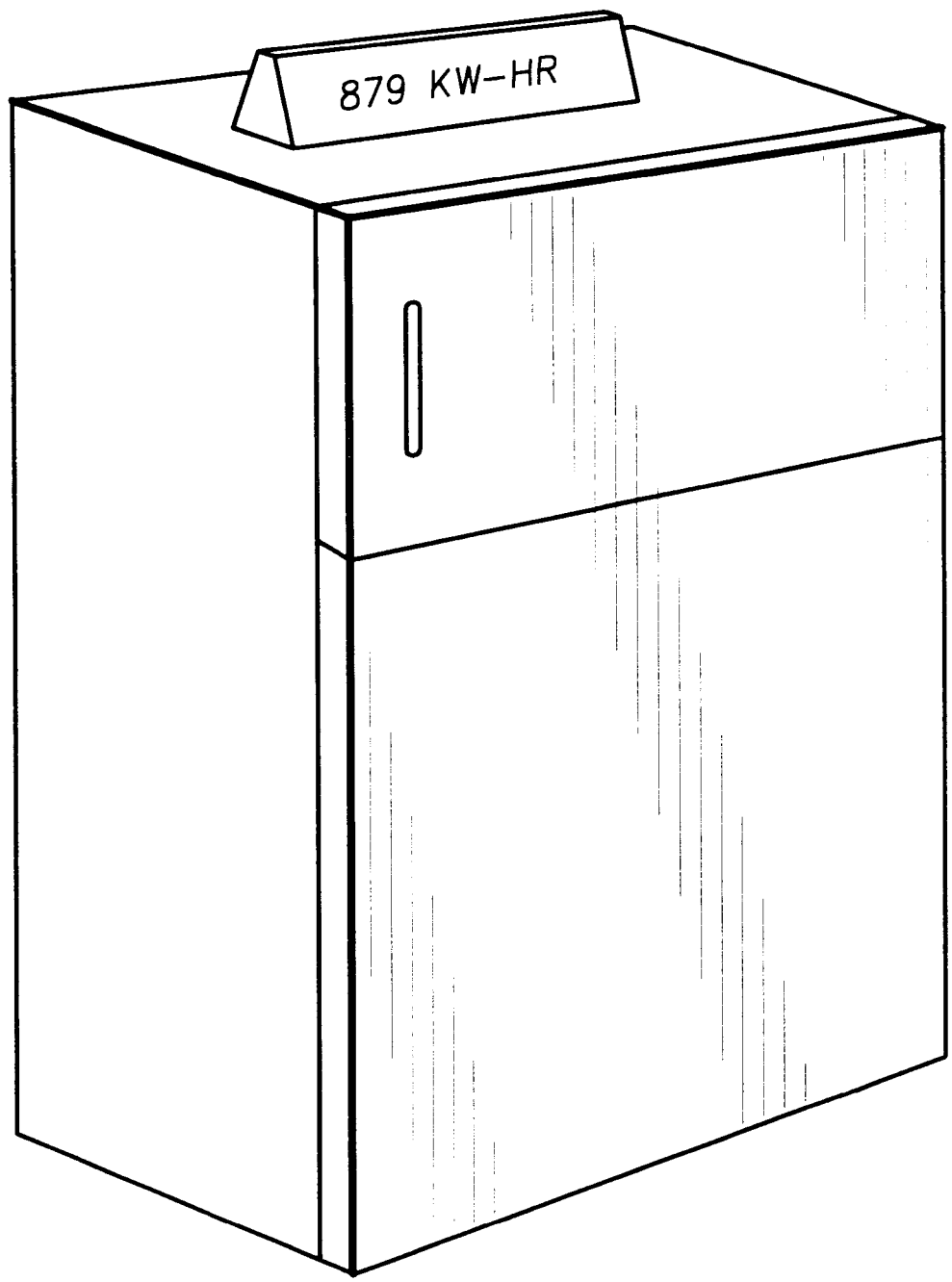
FIG. 3 is a diagrammatic representation of a remote display.

A unique advantage of the DRM and the inherent RF communications is the ability to communicate to a remote display. FIG. 3 shows a crude pictorial representation of a representative display such as may be located at any convenient location in a customer's residence. This simple display is tied into the same data transmission path as the DRM. It is available to advise the customer of any number of messages such as: (i) current electric charge rate, (ii) energy usage to date in the current billing period, (iii) a designated appliance has been disconnected, (iv) bill payment overdue, (v) off peak billing rate, (vi) impending maintenance power interruption, (vii) interruption start and stop time, or (viii) customer contact message (e.g., Merry Christmas).

An analysis in each particular individual system explores the cost trade off associated with providing various desirable options and considering such factors as: (i) type, (ii) size, and (iii) number alphanumeric characters/digits of the customer display. Also considered are (iv) the time to send messages to 1.2 million DRMs, (v) what communication can be programmed to exist between the DRM and the remote display, and (vi) the possibility of interference if un-orchestrated communications take place between the DRM and it's associated remote display.

2.1 Load Control Systems and Communications

The current situation in load control has been documented in Wide Area Radio Based Meter Reading Systems by Donald R. Hoskins, Sixth Annual AMRA Symposium, Sep. 26–29, 1993. Pertinent portions of that report are extracted and paraphrased here for reference.

Load control systems are classified into three categories: a) local control, b) distributed control, and c) direct control. These categories characterize the degree to which decisions are centralized and the extent to which the utility and customer interact before the load is manipulated. In a direct control system, the load is controlled by the utility without any immediate input in any form from the customer's side of the meter. In the past, this direct control system has been the dominant form of load control.

In a local control system, the load is controlled from the customer's side of the meter without immediate input from the utility. With local control systems, manipulation of the customer's load is based solely upon immediate input from the customer's side of the meter. Utility involvement is restricted to indirect inputs such as incentive rates. The results of local control devices have been encouraging where appropriate rates have been instituted. Their application has been very limited in the residential sector because establishing variable rates would require replacement of conventional meters with more advanced and much more expensive meters. The DRM of the present invention permits load control in the residential sector where it has not been economically possible in the past.

Between the direct and local control systems are variations collectively termed distributed control systems, where key decisions are made on both the utility and the customer side of the meter, and where immediate input from both are possible.

The key problem encountered in all control systems is the management of load in a manner which is satisfactory to the customer yet which provides an acceptable degree of control and predictability to the utility. The key technological components of load control are the central controllers and the communications devices.

The controllers generate commands which are encoded and dispatched through some transmission system, and received by the receiver which translates the encoded message and accordingly manipulates the load. While the hardware component of modern computerized controllers is readily available commercially, the software is not. Recent experiences indicate that software deficiencies are responsible for load management problems. Current evidence suggests that software problems are surmountable, but effective software requires time to develop, and must be customized for each utility.

The communications system has been the subject of many discussions among utility operators. At least the following variety of systems are available: (i) radio is currently the predominant communication system used for load management, (ii) power-line carrier (PLC) systems, (iii) telephone, (iv) cable TV, and (v) hybrid Communications systems incorporating two or more of the above systems in one load control system.

The debate over communications systems centers around which best serves the needs of the utility. These needs extend beyond the use of the communications network for load control, and touch on their application to remote meter reading, distribution system automation and other uses.

Existing systems provide a choice between one-way and two-way communications systems. One-way systems are sufficient for load control, but two-way systems allow utilities to monitor more closely the results of load control by transmitting information from the customer to the utility. Furthermore, the two-way system may be exploited to obtain billing information which now requires a visit by the meter reader.

Complicating the utilities' evaluation of the communications options is the fact that two basic options are available with respect to control and use. The utility may invest in a system which it alone controls and uses, or the utility may invest in an information transmission system, the control and use of which it shares with other users. Where others are involved, the costs of the system can be shared, but this arrangement also carries with it the possibility of technical problems in coordination as well as opportunities for conflict between the parties.

Figure 4:
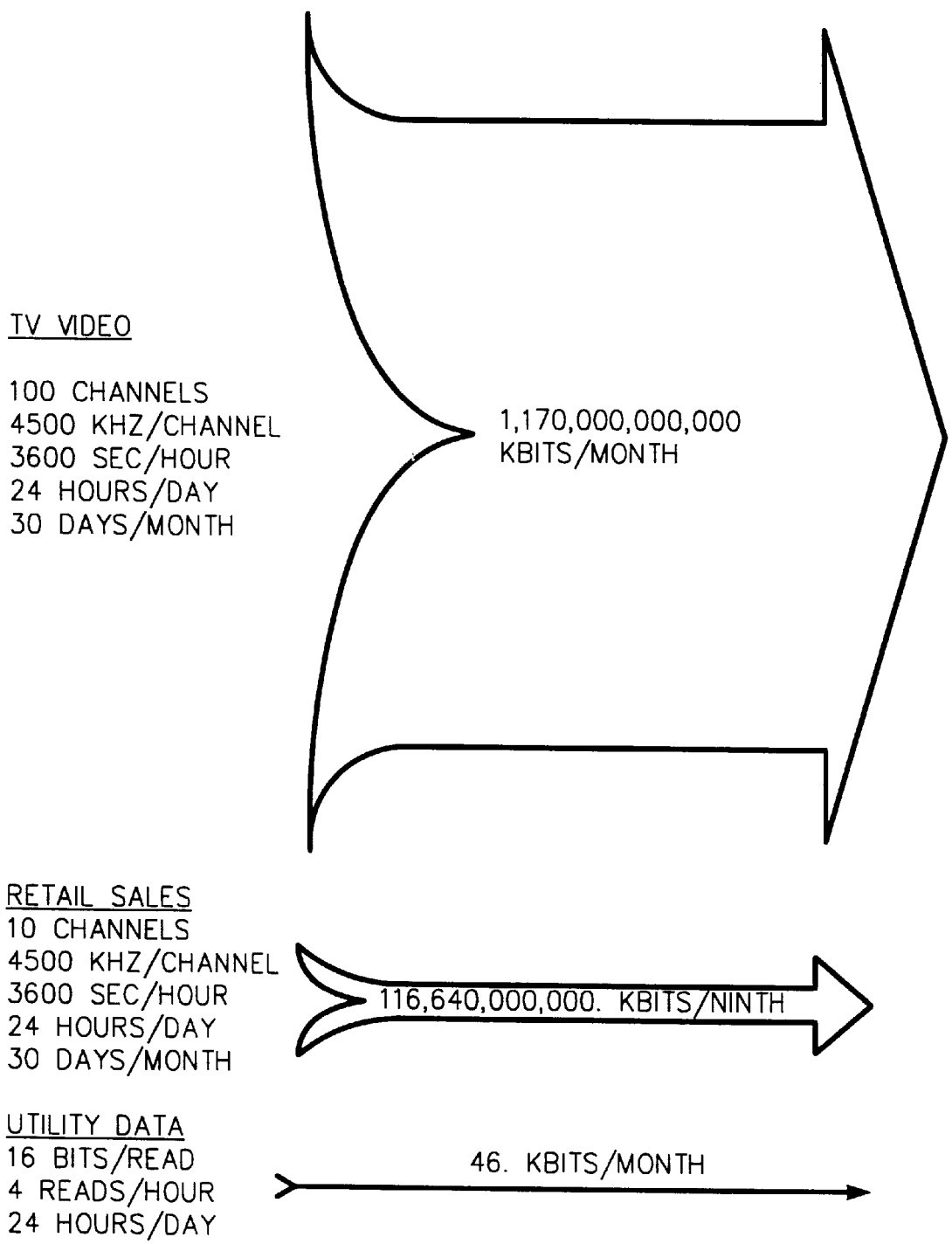
FIG. 4 is a diagram of information flow comparing a system for the demand reporting of electricity consumption by radio to other common communications links.

Before a utility seriously considers merging the meter reading task to the fiber optic National Information Infrastructure (i.e., the information super highway) the data transfer requirements should be considered. FIG. 4 is a diagrammatic representation of information flow in a utility communication network. FIG. 4 provides a perspective on the amount of information to be transferred for three sources of information that might share a common residential terminal. The numbers reflect the relative amounts of data that could be transmitted by each of the three sources over a one month period. It is immediately apparent that the utility meter reading data is insignificant compared to the data requirements for video channels. The low data requirements for meter reading equates to a very low cost data link. There is no economic justification for sharing the cost of a very expensive terminal. This also avoids the complexity, coordination anxiety, risk and liability of working with and through another company. It is also significant that an RF link built into the meter avoids having a hard wire connection from the meter to the fiber optic cable video terminal.

The price of the DRM of the present invention is approximately $30 U.S., or about the same as an existing electromechanical meter. Utility companies have experimented with a number of different communications systems including underground fiber optic loops, dedicated telephone lines, derived telephone lines, and several new radio technologies. The radio technologies can be owned and operated by the utility company and would be best suited to demand side management and automatic meter reading. A summary of the currently available radio systems are as follows:

| Vender | Wide Area Radio Network |
|---|---|
| DAC (CELNET) | Licensed 952/928 MHz |
| Itron | Licensed 952/928 MHz |
| Metricom | Unlicensed 900 MHz |
| Iris | Licensed 952/928 MHz |
| GE UCNet | 800 or 900 MHz trunked |

These radio systems are available and are currently being implemented by a number of U.S. utilities. At least for the present, these systems are satisfying the market need by interfacing a small radio module to existing electromechanical and electronic meters. This retrofit approach creates the need to open, modify, re-calibrate and close existing meters. Obviously the opening and closing would be eliminated if the radio capability were built into the meter in the first place. It should also be pointed out that a retrofit requires more parts than an integrated design and the modification is more labor intensive than an integrated design. On the other hand, A fully integrated design permits a high degree of manufacturing automation.

The major obstacle to providing a completely integrated meter with the radio module included will be achieving the electromechanical meter price of $30. Once that price is achieved, there will be no need to retrofit existing meters because it will be economically viable to provide the electronic meter with the radio communications included. This is an objective of the DRM of the resent invention.

The viability of the radio implementation is demonstrated by pending procurement at Kansas City Power and Light, and Georgia Power Company. Kansas City Power and Light is interested in a Celnet system and is planning to purchase 380,000 meters modified to include the installation of radio communications modules. Five thousand "Seed Meters" will be provided by Celnet to replace existing meters which will then be modified. The installation will continue until all the meters have been modified and retrofitted. This process is scheduled to be completed by 1997. Georgia Power Company has acquired, in 1995, a few Celnet radio modules for evaluation. These procurement validate the interest and need within the utility industry for radio communications.

Several difficulties must be overcome if load management is to be extensively implemented in the 1990s. It is necessary for utilities to develop a detailed understanding of the manner in which their customers now use electricity and are likely to use electricity in the future. This customer usage information must be coupled to information regarding the utilities future supply of electric power. It is also important for utilities to identify and understand the many combinations of load management strategies which can be pursued. Each option must be weighed and compared to other load management options.

These difficulties are aggravated by the frequent lack of adequate analytical tools with which to evaluate load management. Moreover, systematic analytical tools for comparing load management strategies with other strategic options are not widespread.

A final impediment to load management is that customers may be reluctant to permit utilities to control their loads. This has not been a widespread problem so far. When given incentives, customers have been very receptive to load control. It nevertheless represents an area to be explored.

The DRM and the associated system of the present invention provide many of the solutions required to implement and operate effective load control. TOU data will finally be available from residential customers so that usage patterns can be constructed for various/different residential customer categories. This data is then used to construct incentive rates for customers in various categories. Another alternative is to establish an attractive rate structure for direct load control. Having usage profile histories for residential customers opens a whole new avenue for load control. This must be considered significant since more than half of the generated energy is used by residential customers.

2.2 Relation of the Demand Relay Meter (DRM) of the System of the Present Invention to Other Modern Electronic Power Meters The large number of new electronic power meters, and the features of these new meters, both reflect the new and emerging requirements of electric utilities. As the first step in profiling these alternative power meters, a series of inquiries were made to the major suppliers of power meters. The results are summarized in Table 1 of FIG. 5, titled ELECTRONIC METERS. This table shows the currently quoted prices (circa 1995), and some of the features available on electronic meters.

Compared to the standard electromechanical meters, the electronic meter is a relatively new arrival. It is apparent that electronic meters first appeared in the market about 1985. Their arrival was undoubtedly deterred because of the outstanding characteristics of the electromechanical meters. It is difficult to compete with the price and reliability of the electromechanical meters. The figures often quoted throughout the utility industry are a cost of $30 per meter and a life expectancy of 15 years. These figures should serve as an example of what can be accomplished when a fairly complicated product is manufactured for over 100 years and in quantities that are well in excess of 100,000,000 units.

Electronic devices have historically replaced electromechanical devices, and this process is presently continuing. An interesting and notable example of electromechanical technology being replaced by electronics is in ballistic missiles. The very first intercontinental large ballistic missile, the German V2 rocket, was completely controlled and operated utilizing electromechanical components. Another more common example is watches. Electronics now provides a more rugged and more accurate time piece than the old mechanical watch, and at a lower cost as well.

A review of Table 1 shows that the prices of electronic meters are deceasing. This is normal, and will continue as the manufacturing techniques improve and as power meter design evolves into a high production configuration. The company that first brings the price of an electronic meter down to the price of an electromechanical meter will face an almost untapped market and sales will increase exponentially. The utility market will respond because of the added capabilities offered in the electronic meter. Initially, there was doubt as to whether or not the electronic meter could provide the required accuracy and dependability. That question has now been successfully answered. Effectively, the only remaining barrier to the inevitable obsolescence of the electromechanical meter is the residential meter's low price.

An interdependency exists between achieving the desired price and the sales volume. Once the a residential meter price of $30 is achieved, the volume will explode. But, achieving the $30 price depends on buying components and manufacturing at the in high volume. The recognition of this interdependency is the basis of the DRM of the system of the present invention. The success of the development will be constrained by the design-to-cost criteria. Component development is expected to be accelerated by the cellular telephone technologies recently developed.

2.3 Design of a Preferred Embodiment of a DRM for Use Within a Preferred Embodiment of the System of the Present Invention The design of a preferred embodiment of a DRM for use within a preferred embodiment of the system of the present invention is, as with most developments, an extrapolation from existing designs and technology. With the DRM, this is particularly true, since the various ingredients are separately prover entities. The innovation, inventiveness and uniqueness emarates from the economic marriage of these proven entities. It cannot be minimized. However, achieving the desired price requires diligent applied engineering. Every aspect of the DRM design has been scrutinized to assure the lowest possible cost commensurate with the specified performance.

Some of the state of the art techniques that must be utilized and incorporated in order to achieve the price objective are as follows.

High volume, low cost microprocessors with built-in RAM, EEPROM, communication port, and digital to analog converters are used.

High volume, low cost AM/FM receiver IC's are used.

The DRMs are assembled with surface mount components and assembly techniques, automatic parts placement, and automatic soldering and board cleaning.

Shorts, opens and component value testing are automatically performed.

Fabrication and assembly error detection and feedback is automatic and continuous.

A bill of material, validating the target $30 price, has been compiled and is listed in Table 2 shown in FIG. 6. All the components listed are intended to represent the type and cost of the final design. The pricing validates the target DRM price.

Figure 7:
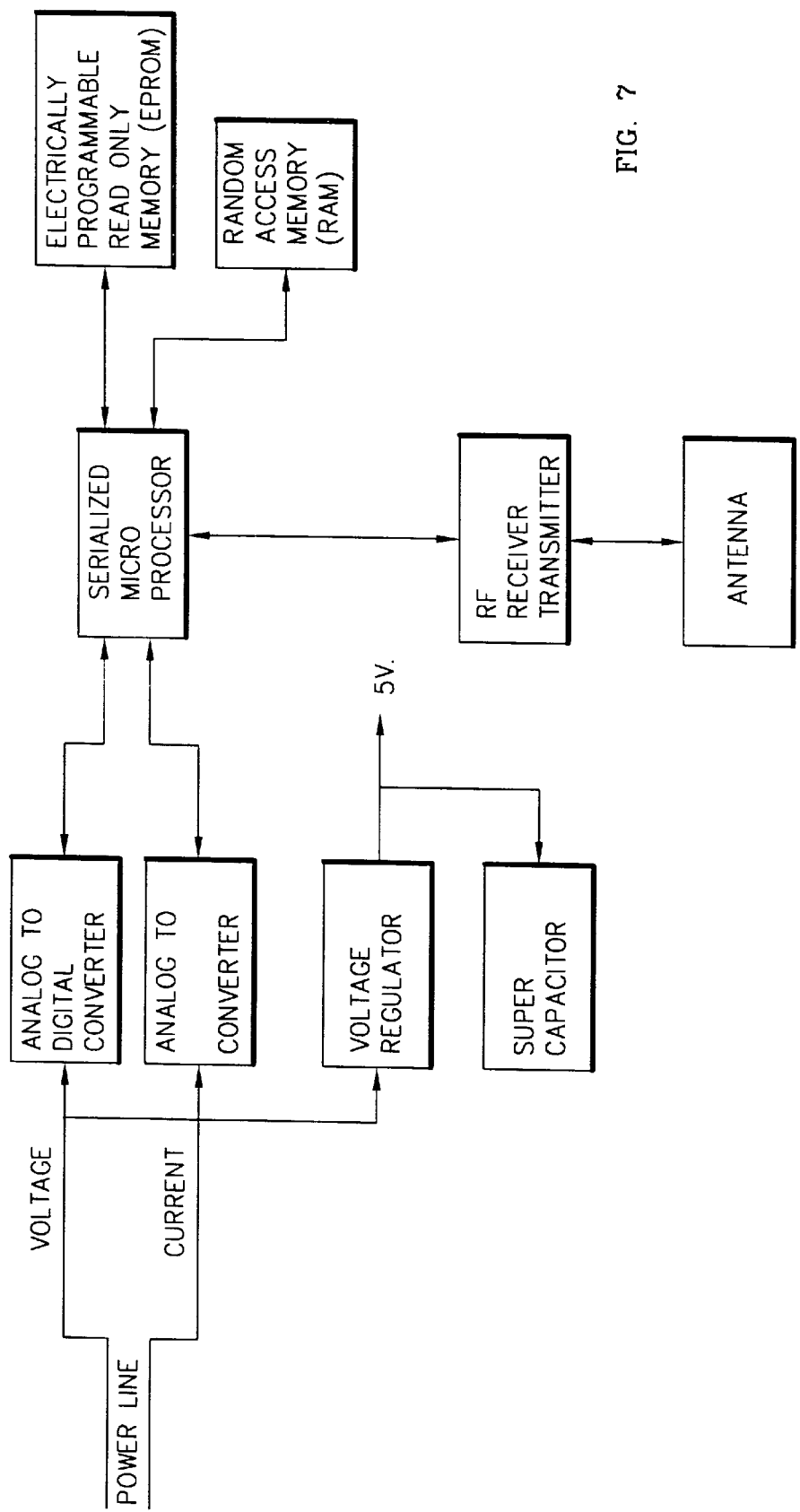
FIG. 7 is a simplified schematic block diagram of a demand relay meter in accordance with the present invention.

FIG. 7 shows a simplified block diagram of the preferred embodiment of the DRM depicting the major functional elements. All of the required functions are presently available now in building block components having a high level of integration. However, the ultimate goal to achieve the lowest possible cost of the DRM will most likely require custom Application Specific Integrated Circuits (ASICS) so as to approach a single chip implementation for each separate function.

Technique and approaches required and desired to achieve the price objective are as follows.

Surface mount components and assembly techniques are used. Note that current high volume assembly of surface mount electronic design essentially reduces touch labor in manufacturing to near zero.

Custom ASICS and LSI components are used wherever possible. This serves to reduces parts count, improve reliability, and reduce manufacturing costs. As stated above, current technology allows integration of major functions on a single chip. For example, the microprocessor selected for the DRM has A/D, CPU, Memory, Timer, and I/O all resident on a single chip.

Automated testing is employed. Automated testing of all DRM functions, including calibration, is feasible with current technology.

3. Objectives

An increased capability electronic power meter must be provided at a price and performance level comparable to the existing residential electromechanical power meter. The added capability features will include the following:

Two-way RF communications for automatic meter reading are built-in.

Hourly time-of-use (TOU) measurements are retained for 30 days, or, alternatively, TOU measurements every 2½ minutes for 2 hours are retained for the same thirty days.

Time is recorded, and a tampering alarm set and sent, at the onset of any tampering attempt so as to help preclude energy theft.

A remote display is provided for customer communications

Finally, an output for load curtailment is provided.

3.1 Financial Objectives

Most electric utilities can realize savings in four areas from DRM system implementation. These four areas of potential savings are: 1) Meter Reading, 2) Cash Flow, 3) Revenue Protection and 4) Load Leveling. Each of these areas can be quantified based on some defined assumptions. Since the DRM system departs from "business as usual", and is without direct precedence, an electric utility will have to evaluate the results along with the assumptions. Hopefully, the electric utility can refine the assumptions based upon the experience and accrued knowledge that exists within the electric utility organization.

3.1.1 Meter Reading: With a Particular Electric Utility as a Case Study

A literature review indicates that the cost of reading meters has been evaluated endlessly. See Automatic Meter Reading, The Trade-Off Between Technology and Economics, Andrew Smith, Sixth Annual Akmara Symposium Proceedings Sep. 26–29, 1993. See also "When (If Ever) Does AMR Pay For Itself?", Richard D. Alexander, President Alexander & Associates, Sixth Annual AMRA Symposium Sep. 26–29, 1993, pp 37–44. See also AMR Perspectives, Cameron Randolph, The 14th Annual National Meter Reading Conference (NMRC) Jun. 23–25, 1993.

This almost endless evaluation stems from the fact that meter reading has continued to be very labor intensive and expensive. Over the years many cost-saving techniques have been implemented so that the cost to read an individual meter is nominal. The current average cost to read a meter is between $0.50 to $1.00. Both the literature and direct phone calls to utilities in all parts of the country verify and substantiate these numbers. See Table 3 UTILITY SURVEY shown in FIG. 8.

It is interesting that some utilities will provide the average cost to read a meter to within a penny and others will state it is about the national average of $0.50. There is certainly some reason to believe that all the management, indirect fringe benefits and liability expenses are not appropriately factored into the numbers provided, but there is consistency in the figures.

One particular exemplary electric utility—San Diego Gas & Electric Company of San Diego, U.S.A (SDG&E), provides a good sample case for evaluating the savings from use of the DRMs, and system, of the present invention. San Diego Gas & Electric Company's own estimate of $0.50 to read a utility meter is consistent with the rest of the nation.

Research at SDG&E established that 1.1 million active electrical meters and something less than 100,000 installed but currently inactive meters exist in the system. Assuming that the inactive meters should be checked periodically, 1.2 million was considered the total number of meters, and was used to calculate the annual savings. This easily establishes the total cost to read meters as 1.2 million meters×12 reads/year×$0.50/read=$7.2 million. As a further refinement it was realized and recognized that the meter reading personnel are currently used to survey equipment status and report meter tampering. Therefore the $7.2 million savings is reduced 20% to reflect the retention of one fifth of the current staff to continue the surveillance function. The resulting meter reading savings is 80%×7.2 million=$5.76 million.

An interesting conclusion can be drawn from the data. If we assume that an average meter costs $30 and lasts 15 years, then the cost of reading the meter is approximately three times it's acquisition cost. This logic suggests that the DRM price projection of $30 detailed in a previous section may be competitive.

3.1.2 Cash Flow in the Utility Industry

A number, if not all, of the utilities have adopted a method of improving their cash flow and thereby reducing their working capital requirements. This is accomplished by establishing a written or unwritten agreement with large industrial customers. It is nearly universally accepted that the utilities must be accommodating to their customers, particularly their very large customers. In the process, the utilities are finding that most of these large industrial customers are constantly examining their operations and looking for ways to reduce their energy usage. These large industrial customers are therefore most appreciative of a detailed breakdown of their usage. The end result is that the large incustrial customers are willing to reduce their invoice payment period in exchange for a detailed energy usage breakdown. This is a win-win situation where the customer gets information to reduce costs and the utility saves interest dollars for the working capital that is no longer needed.

There are documented cases where industrial customers have reduced their invoice payment period nearly 30 days. Mississippi Power has reported that Chevron Corporation has agreed to pay their bill within 24 hours in exchange for customized billing information—even to the extent of paying on a daily basis. This was particularly important since Chevron's billing rate runs in excess of $1 million per month. It is apparent that every month that Chevron pays within 24 hours, Mississippi Power realizes nearly a $1 million reduction in their working capital requirements.

The DRM system of the present invention permits an electric utility to provide the customized billing information for large industrial customers, and also to expedite the meter reading time for the entire customer base. As a first approximation, the cost savings for electric utility can be calculated as 7%×$1,514,600,000.×(5 days/30 days)=$17,670,000. The numbers used are defined as follows: Seven percent (7%) equals the interest rate paid by electric utility for working capital. $1,514,600,000 is the annual electrical revenue for SDG&E. Five (5) days is the average number of days that the annual electrical revenue payment could be expedited utilizing the DRM system. Finally, thirty (3) days is the existing invoice pay period.

There is nothing magical about a 30 day billing cycle. Energy usage could be billed bi-weekly reducing the pay period by an additional 10 days.

3.1.3 Revenue Protection

Revenue protection expenditures are viewed by the larger utility companies throughout the US as a painful but necessary expense because of persistent theft losses. Some of the small utilities claim that theft is small enough to be ignored. Other small utilities have decided that it costs more to prosecute than to absorb the losses. The large utilities are of the opposite opinion. The Department of Justice is quoted as saying theft represents 2% of the gross revenue. On one occasion a PUC representative claimed theft represents 5% of the gross revenue. Unfortunately, a comprehensive method for establishing the degree of theft does not exist.

The electric utility Revenue Protection Manager of SDG&E states that theft within the SDG&E service area is down from about 2% several years ago to about 0.75% currently. Certainly the amount of theft going on at any given time is difficult to estimate. It is clear, however, that hard evidence does exist of extensive theft. Presently the SDG&E revenue protection staff cannot keep up with the approximately 200 reports of meter tampering that come from the meter readers monthly. It is also apparent that considerable time and capital equipment is being utilized in the pursuit of revenue protection.

Part of the reason for electric energy theft comes from the design of the electromechanical meters currently being used. All the meter plugs are symmetrical, so a thief can easily remove the meter, turn it over, and plug it in upside down. When this is done, the meter runs backward and conveniently reduces the metered usage reading.

At present, the equipment available for revenue protection is expensive and only used where there is reason to believe that a theft will shortly occur or reoccur. Examples of equipment currently being used to obtain evidence for convictions are video cameras and camouflaged remotely read meters. Knowing some of present power meter's susceptibilities to tampering is valuable in the design of the DRM. A combination of detection sensors and a real time alarm capability in the DRM provides a major impact on revenue protection. One could conclude that deterring theft is a good deal less costly than the labor intensive process of accumulating conviction evidence, i.e. an ounce of prevention is worth a pound of cure.

There are a number of design options that are economically included in the DRM design that give a potential thief amble reason to reconsider. Some of these options are:

A motion detector that would send a real time alarm if any physical tampering occurs.

Meter construction is shock resistant, such as by solid encapsulation.

Communication with the police may optionally be established for real time meter tamper apprehension.

A magnetic field detector may send a real time alarm if a strong magnetic field is applied to saturate the current transformer.

A disconnect alarm may be used to record the time if and when a disconnect occurs.

Since SDG&E has been able to reduce the theft from about 2% to about 0.75% using existing techniques, it is assumed that another 25% could be eliminated utilizing the DRM system. This would produce a saving of 0.75%×$1,514,600,000×25%=$2,840,000.

3.1.4 Load Leveling

The concern regarding load leveling appears to vary between the large and small utilities. In Mississippi, where the Tennessee Valley Authority provides an abundance of reserve power, load leveling is given a very low priority. In contrast, the Black Hills Power and Light (BHPL) utility in South Dakota is very concerned with load leveling and load management. The Black Hills Power and Light utility currently provides a low rate to encourage residential customers to install $200 to $300 "recorders" on their meters so the peak usage can be monitored. Since the peak usage is monitored, BHPL provides the customer a lower rate provided the customer keeps the usage below a set level during peak usage periods. Typically, the recorder expense is saved by the customer in a "few months" according to Aaron Eisenbraum of BHPL.

The DRM will provide time of use (TOU) data each hour for 30 days. This will provide the necessary usage information so that rate schedules can be structured to reduce peaks. The DRM design would permit this to be accomplished on the residential meters as well as the commercial customer meters.

A very rough estimate for the kind of saving that might be expected from the DRM system implementation for load leveling was 1% of the gross electrical revenue or 1%×$1,514,600,000.=$15,146,000.

3.1.5 Financial Objectives Summary

Based upon the above assumptions and calculations the total overall estimated annual savings from installing the DRM system at electric utility is tabulated as follows:

| | |
|---|---|
| METER READING | $5,760,000 |
| INDUSTRIAL CASH FLOW | $17,670,000 |
| REVENUE PROTECTION | $2,840,000 |
| LOAD LEVELING | $15,146,000 |
| TOTAL | $41,416,000 |

3.2 Technical Objectives and Design

The performance of the DRM system involves relaying data through the Ericsson communications system as described in the System Overiew (Section 2.1). The heart of the system is the DRM and an understanding of its various functions will clarify the overall system operation.

3.2.1 Demand Relay Meter

Irrespective of the system operational sophistication, the DRM itself is very simple. FIG. 7 shows the functional elements within the DRM. The only required electrical connection to the DRM is to read the voltage and current. The power measurement requires the sampling of both the line voltage and the line current. Measurement of the power factor is automatically accomplished by sampling the voltage and current at a rate high enough to establish the phase relationship of the two wave forms as a function of time. The microcontroller will produce the power reading by multiplying the voltage and current readings. A resulting 8 bit digital byte will be stored in memory once each hour. This process is repeated every hour for 30 days. At the end of the 30 day period the oldest reading is replaced with a new power reading.

Voltage sampling requires a close tolerance resistor divider to bring the line voltage level down to around 5 volts. This reduced voltage can then be digitized directly by an existing analog to digital converter (A/D) integrated circuit (IC). It is currently possible to buy microprocessor/microcontroller chips with built in A/D. This greatly simplifies the hardware and minimizes the overall parts count.

Probably the most critical function in the DRM will be the current sensing. Fortunately, a great deal of ground work has already taken place in the current sensing area. There are current sensing transformers available with the required accuracy. It is still considered the most cost sensitive component and operational testing is anticipated to determine the best compromise between the component cost and measurement accuracy. As long as the production quantities are dictated by the quantity of DRM required to satisfy the residential market, the DRM target price will be achievable.

The heart of the DRM is the microcontroller. The price and capability of this particular part is what makes the DRM feasible. Computer advancements are well advertised with respect to speed and amount of memory. Equally noteworthy is the cost and availability of small inexpensive microcontrollers. This particular part is in the fast track development category and the current low price is directly related to the production volume. Anti-lock brakes and other automotive applications have created an enormous market for these small microcontrollers and several manufacturers have responded with competing devices. The DRM can now profit from this evolutionary development.

A member of the family of small inexpensive microcontrollers and a strong contender for the DRM application is the M-68HC05 produced by Motorola. The features offered in this device are impressive even ignoring the extremely low price. Some the features are: 1) external interrupt capability on 4 I/O pins, 2) fully static operation with no minimum clock speed, 3) computer operating properly (COP) watchdog, 4) 15-bit: multi-function timer with real-time interrupt circuit, 5) power-saving and data-retention mode, and 6) direct, indirect and relative addressing modes.

Another development that simplifies the DMR is non-volatile memory. Instead of using battery backup for stored data, non-volatile Electrically Erasable Programmable Read Only Memory (EEPROM's) are used. Previously, the rewrite limitation prevented EEPROM's from being used to record renewable data. EEPROM's currently have rewrite endurance's greater than 100,000 erase/write cycles. This rewrite capability in a 16 k bit EEPROM will allow the DRM to record and retain the power reading every hour, every day for 30 days and keep updating the recorded information for the life of the meter.

Since a battery is not required to maintain the memory, another relatively new component was incorporated to provide limited operation in the event of a power failure. This operational extension allows the DRM to send an alarm over the RF link if a power disconnect takes place and also allows the disconnect time to be recorded. The new component that provides the extended power life is a "Super Capacitor". A super capacitor is nothing more than a capacitor that retains enough energy to power the DRM for a limited time after the primary power is shut off. Only in the last few years have capacitors become available with sufficient capacity for this purpose.

The final elements of the DRM needed to accomplish the size, price and performance requirements are the RF receiver, transmitter and antenna. A survey of existing ICs established the existence of receiver chips developed for broadcast receivers and pagers. This led to an investigation of frequency band availability in the VHF range. A number of phone calls led to an introduction to the UTC Service Corporation located at 1140 Connecticut Avenue, Washington, D.C. Their services are used extensively by the utility industry, and historically they were a part of the utility industry.

The UTC Service Corporation was contacted to determine whether or not a frequency allocation would be attainable. Richard Doody reported on Jul. 17, 1994 that the UTC computer data base showed at least two frequencies were available in the immediate San Diego area. These two frequencies were 173.3625 MHz and 173.2625 MHz. They were narrow band, about 6 KHz, and are referred to as "splinter frequency bands". Most if not all the metropolitan areas in the US would have a few splinter frequency bands available. This input was considered very important because of the following reasons:

First, free space losses decrease as a function of the frequency squared and coverage is easier to achieve at VHF than at higher frequencies.

Second, power transistors are more plentiful and less expensive at the lower frequencies.

Third, instrumentation needed to develop and test circuits at VHF is less expensive, more comprehensive and easier to use.

Fourth, lumped constant components can be used at VHF rather than distributed constant design.

Fifth, omni-directional coverage is a necessity for the DRM application and omni-directional short stub antennas work well at VHF.

Sixth, the narrow splinter frequency band will simplify impedance matching the antenna Final selection of components is a function of individual designs, but a common receiver is the MC13135, Dual Conversion Narrowband FM Receiver manufactured by Motorola. This IC offers the following features: 1) complete dual conversion fm receiver—antenna input to audio output, 2) low impedance output, 3) buffered first local oscillator (lo) output to drive phase lock loop, and 4) a Colpitts first local oscillator design for a crystal or voltage controlled oscillator.

Once the receiver is selected, either a simple frequency multiplier or a frequency synthesizer IC will be required to drive the final transmitter transistor. All the range calculations indicate that 1 watt of output power should provide adequate range and not jam another similar RF link up to 100 miles away. The 2N2222A was selected as a very good prospect for the final RF transmitter output stage. This transistor is a very common (inexpensive) part but it has adequate gain band width capability for this application.

3.2.1 Demand Relay Meter Detail Design

Figure 10:
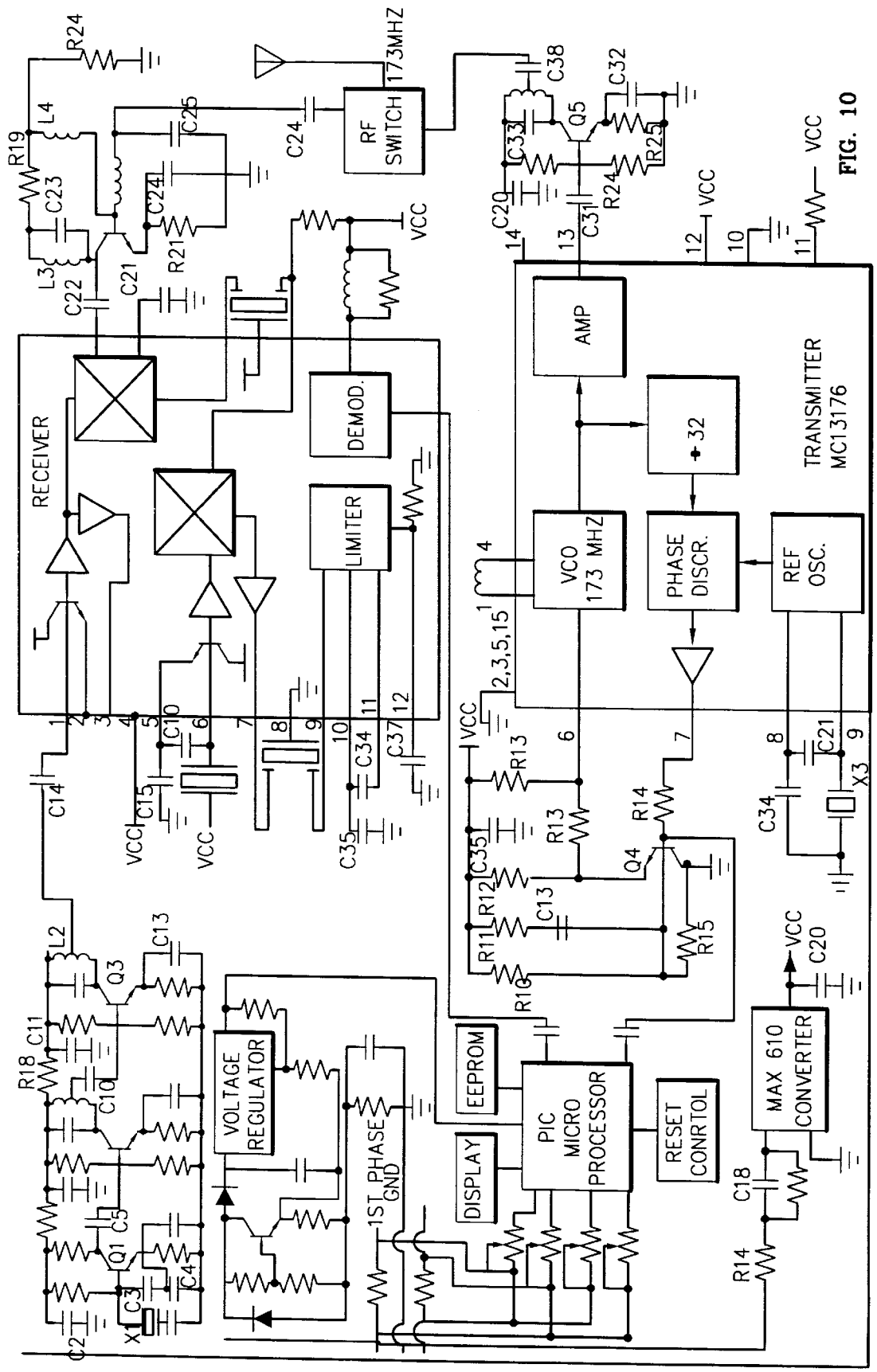
FIG. 10 is a detail schematic block diagram of the Demand Relay Meter in accordance with the present invention.

The block diagram shown previously in FIG. 7 is expanded in FIG. 10 to show details within each major function. As mentioned in Paragraph 2.1, the design objective would be to obtain the functionality shown with a minimum parts count.

Figure 9:
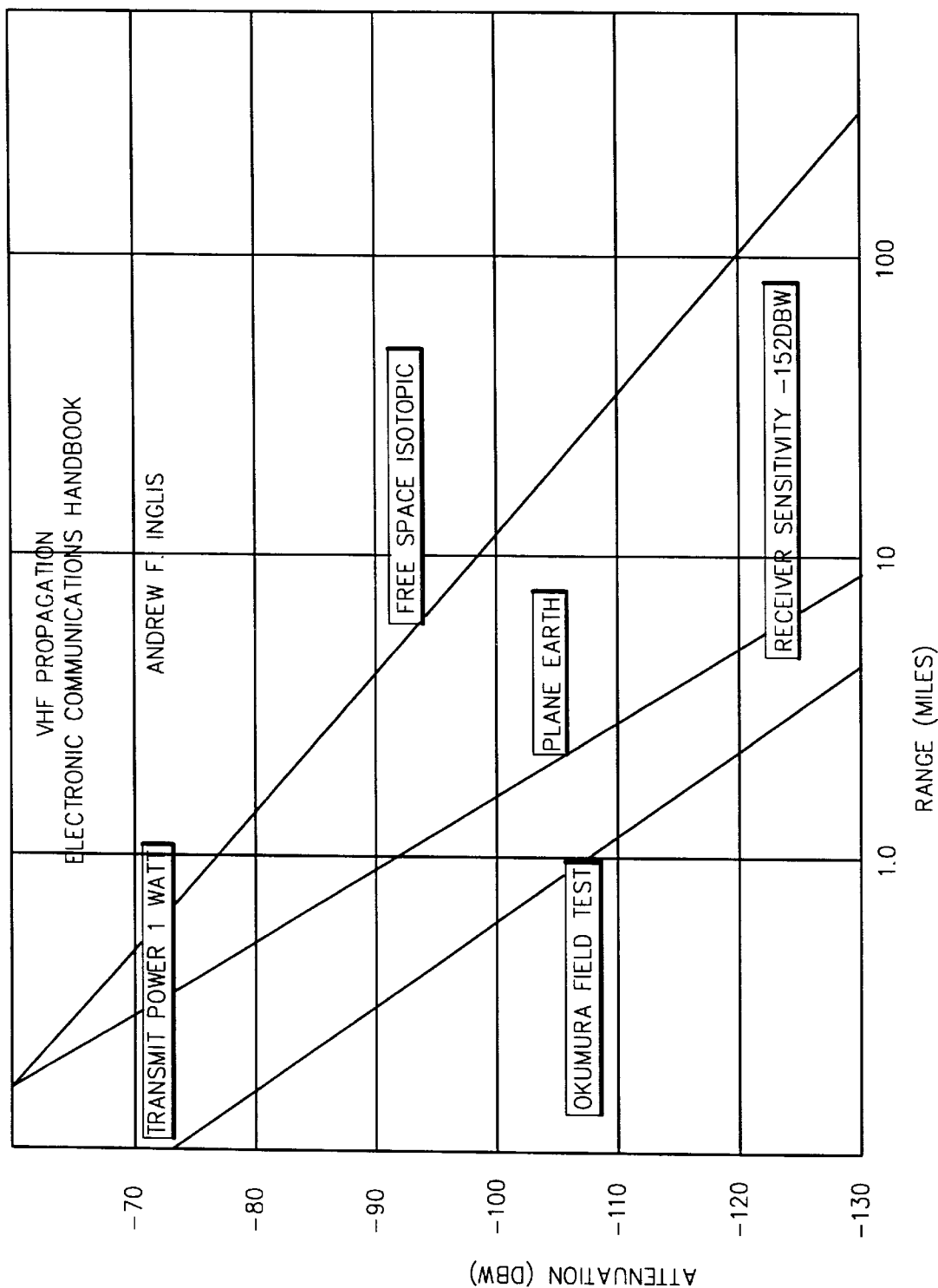
FIG. 9 is a graph showing VHF radio propagation.

Features of the design shown in FIG. 9 are: 1) input transient protection (lightning and surges), 2) independent current and voltage measurements on each line, 3) stabilized power supply to handle brown-outs and voltage drops, 4) a microprocessor with integral A/D, CPU, memory, and I/O, 5) a transmitter with stable frequency control, BFSK modulation, and 1 watt output, and 6) a sensitive receiver with preselection filter for interference reduction. Further information on the DRM design is contained in companion U.S. provisional patent application filed on an even date herewith for a DEMAND-RELAY-REPORTING ELECTRONIC WATTMETER WITHOUT A CURRENT TRANSFORMER SENSOR, the contents of which are incorporated herein by reference.

3.2.1.1 Sensor and Input Design

The DRM is preferably mechanically interchangeable with Form 2S meters. Lightning protection would be in the form of sparks gaps plus surge arresters across the input lines.

The current sensors would use standard current transformers configured to handle the full load current of 200 amperes. Calibration to the required accuracy would be accomplished by storing calibration constants in the microprocessor memory during initial test. These constants would be stored in the non-volatile memory.

3.2.1.2 Power Supply

The DRM power supply uses a transformer, full wave bridge, energy storage and a DC to DC converter to provide a stable power source. The power supply operates with loss of either input and under brownout conditions. An extremely high capacitance capacitor (Super Cap) would be used for energy storage adequate to allow an alarm transmission upon loss of power if desired. The components would be surface mount to meet the objective of low touch labor content.

3.2.1.3 Microprocessor/Memory Selection

An exhaustive search for the optimum microprocessor has not been done. However, there appears to be mary low-cost microprocessor/microcontroller candidates for the DRM. Two such are the Motorola MC 6805S2 and the Texas Instruments TSS400. Salient features of the two units are as follows

| MOTOROLA | TEXAS INSTRUMENTS |
| --- | --- |
| MC 6805S2 | TSS400 |
| A/D 4 Channel | 4 Channel |
| Multiplex 8-Bit | Multiplex 12-Bit |
| ROM | RAM |
| Digital I/O | Serial I/O |
| LCD Display Drive | No Display Drive |

Either of the candidate microcontrollers match the block diagram with the TI unit having greater accuracy plus the display drive capability. However; the TI unit, being newer, is also more expensive at the present time. At any rate, a more exhaustive survey of current units is indicated prior to making a final selection.

The DRM design will require a component of EEPROM (Electrically Erasable Programmable Read Only Memory)

for a non volatile store of meter readings and time/date information. A microcontroller with the desired A/D function and EEPROM has not been located. However; it is likely that such a controller may now exist or be available in the future.

However; as will be seen in the DRM learning curve projection in subsequent paragraphs, the single chip transmitter receiver is realistic in the time frame projected for high volume production.

The final selection of components will be made as part of the design, but a possible initial receiver component is the Motorola MC 13135 dual conversion narrowband FM receiver. This IC offers a complete FM receiver with dual conversion and FM discriminator. This constitutes the receiver chain from the preselector filter output to the data input to the processor as shown in FIG. 10 (approximately 1/3 of the Rx/Tx function).

The transmitter chain blocks shown in FIG. 10 use a Qualcomm direct digital synthesizer modulated with a binary frequency shift keying (BFSK) modulation which in turn is used as the reference in a phase-locked loop to stabilize a VCO used to generate both the first local oscillator and the transmit frequencies. All components in the blocks shown are standard current telecommunication products.

The specific antenna design has not been investigated in detail. It would be most desirable to integrate the antenna with the meter case since external connection and remote antennas are easy targets for vandalism. The first option would be a loop integral to a non conductive portion of the case. The narrow bandwidth precludes any matching issues which might occur.

3.2.1.4 Transmit/Receive Function

There currently exists an on-going explosion in the manufacture of highly integrated RF components for wireless communication. This has been fueled by the rapid cellular phone expansion as well as other wireless communications. The advent of Personal Communication Bands will no doubt accelerate the process.

As a result, there are currently available single chip devices which implement an entire transceiver including power amplifiers, low noise amplifiers, mixers and demodulators. Most require a frequency reference and some off-chip filtering.

The DRM design with a one watt output requirement (+30 dbm) is not currently available in a single chip form. Current technology would probably require a minimum of four chips to implement the transmitter and receiver functions shown in FIG. 7. However; as will be seen in the DRM learning curve projection in paragraph 6.1, the single chip transmitter receiver is realistic in the time frame projected for high volume production.

3.2.2 Frequency Selection

The preferred frequency choice is in the VHF range. This choice is subject to revision after a comprehensive study of ambient background noise, path analysis and component survey.

The UTC Service Corporation was contacted to determine whether or not a frequency allocation would be attainable. Richard Doody reported on Jul. 17, 1994 that the UTC computer data base showed at least two frequencies were available in the immediate San Diego area. These two frequencies were 173.3625 MHz and 173.2625 MHz. They were narrow band about 6 KHz, and referred to as "splinter frequency bands". He said that most if not all the metropolitan areas in the US would have a few splinter frequency bands available. This input was considered important because of the following reasons:

Free space losses decrease as a function of the frequency squared and coverage is easier to achieve at VHF that at higher frequencies. For example, the path loss differential at 1 mile is 15 db comparing 900 MHz to 170 MHz.

As a general case, components are cheaper with higher yield of LSI devices at lower frequencies.

There also exists rationale for selection of UHF or higher frequencies. The current explosion of component development for digital and voice communication is concentrated in the 800–900 MHz and 1900 to 2100 MHz bands. The high volume for these devices will drive the prices down and thereby negate any component cost advantage for the VHF band. The ultimate frequency selection for DRM should be kept open pending a comprehensive study of all options.

3.2.2 DRM Range Margin

Determining the system operational range has historically been an empirical exercise and for a number of reasons it will continue to be an empirical exercise. There have been many studies which have bracketed the losses and interferences, but actual measurements are ultimately desirable and highly recommended for any particular area and application.

The impediments to predictable VHF communications in any realistic environment are obstruction losses and interference "noise". The noise must include man made noise, which can be substantial in an urban environment, as well as atmospheric noise which is reasonably predictable. An exhaustive study was conducted in Japan by Andrew F. Inglis that covers both the urban and rural conditions. The referenced work established the following equation for the point to point, Plane Earth losses in the VHF range:

$$\text{Attenuation}=20\log (h_t h_r g/D^2)=-108 \text{ DB}$$

where
  $h_t$=transmitter antenna height (15 FT.)
  $h_r$=receiver antenna height (5 FT.)
  g=transmitter antenna gain (1.5)
  D=range (5280 FT. OR 1 MILE)

A graphical presentation of this attenuation as a function of range is shown in FIG. 9. The difference between the Plane Earth and the Okumura curves was attributed to the added attenuation of the urban environment. It is also evident that the test was made from an urban location to a more rural area since the difference becomes less as the range increases. These data show that 12 dB to about 20 dB additional range margin should be anticipated over the plane earth model. This additional range margin will be useful in overcoming attenuation from structures—particularly when the DRM is inside the structure.

Representative attenuation factors that various obstructions in the transmission path have on the received signal level have been tabulated. These attenuation factors are shown in Table 4 of FIG. 11.

These factors are already included in the Okumura field test data but could be added to the Plane Earth curve for further refinement and/or to evaluate a different environment.

The theoretical range margin calculation results are shown in Table 5 of FIG. 12.

3.2.3 DRM Polling

The exemplary San Diego Gas and Electric (SDG&E) electric utility currently has a service area of about 4500 square miles with about 1.2 million meters installed. The meter density varies tremendously over the service area but if the total area is divided into 100 square mile areas there will be meters in each and every 100 square mile area.

Figure 13:
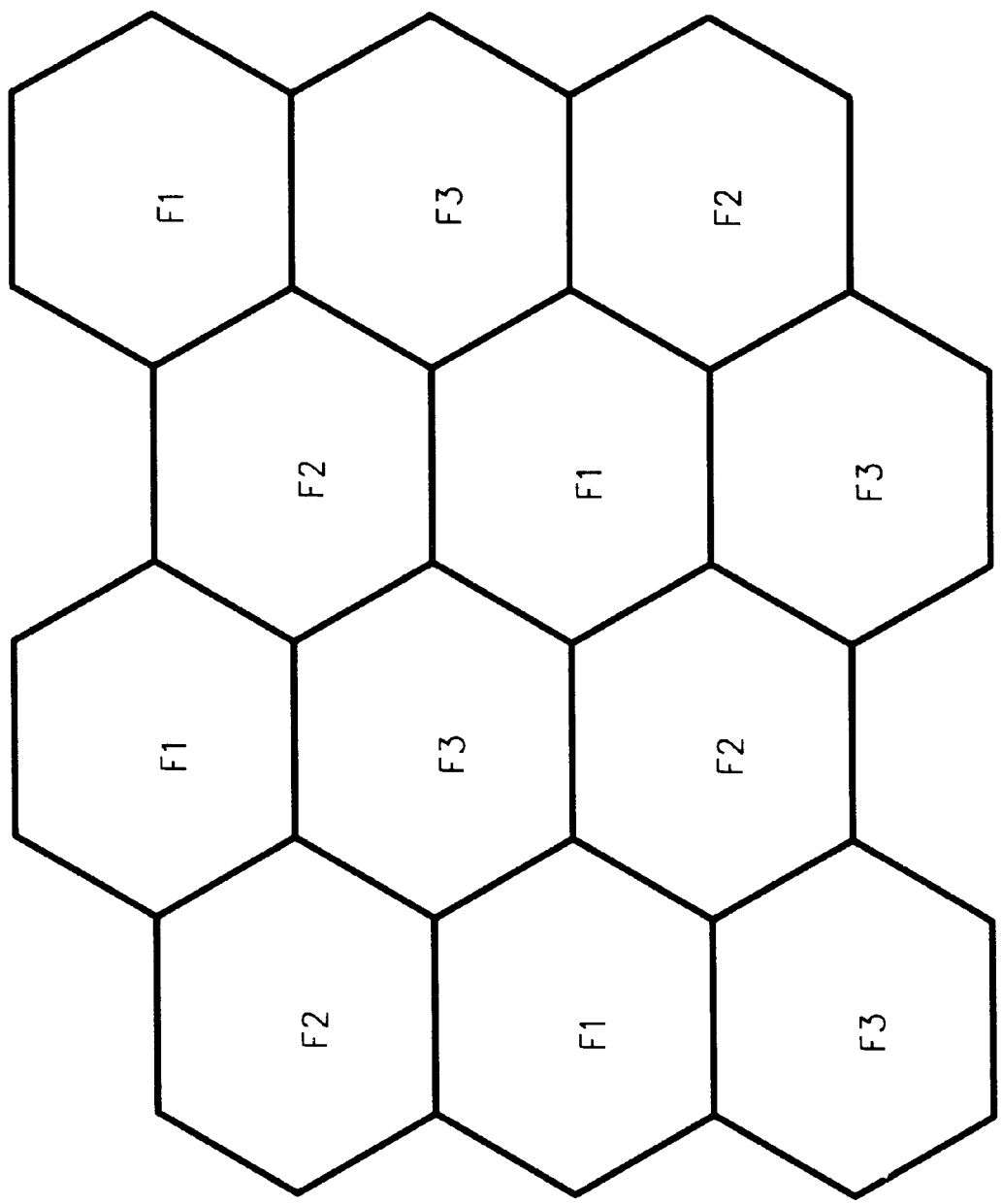
FIG. 13 is a diagram of node area frequency designations in the system for the demand reporting of electricity consumption by radio in relays to a base station in accordance with the present invention.

The proposed system will incorporate a Hexagon grid as shown in FIG. 13. This proposed grid will use three different RF interrogation frequencies in the VHF band. This frequency diversity scheme allows meter interrogations to take place in every Node area simultaneously. Interfererce is avoided because no two adjacent Node areas will be operating on the same VHF frequency. Inside the Hexagons, the individual DRM are is interrogated in sequence (time diversity). As a first approximation to the time required to interrogate all the meters in the system, it will be assumed that the meter distribution is linear throughout the entire 4500 square miles. A further refinement will be possible when the actual meter distribution is established.

Figure 14:
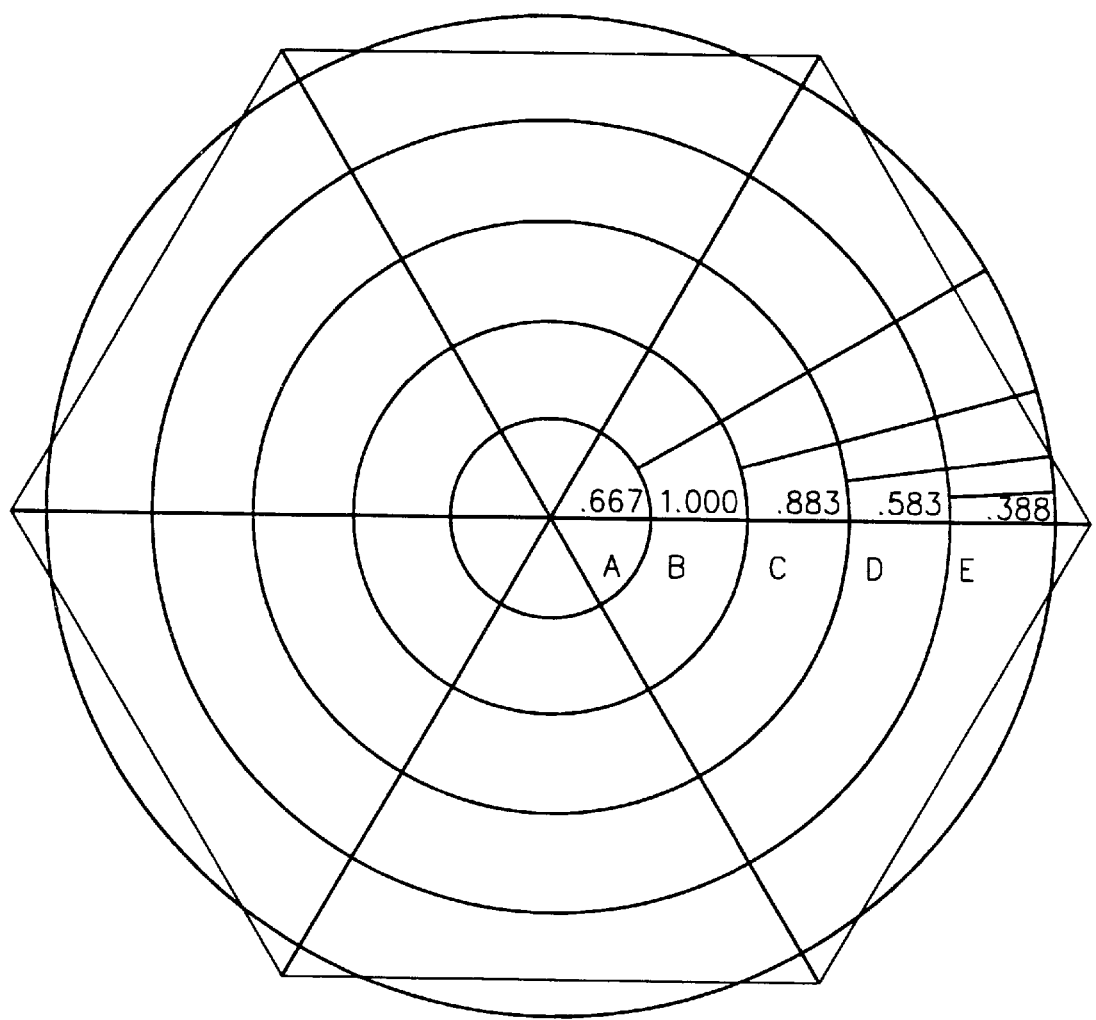
FIG. 14 is a diagram of the interrogation sectors in the system for the demand reporting of electricity consumption by radio in relays to a base station in accordance with the present invention.

Assuming each Hexagon has an area of 100 square miles, the side length can be calculated to be 6.87 miles. Then if a circle with an area of 100 square miles is imposed on the hexagon, the circle radius can be calculate to be 5.64 miles. A scale model of this configuration is reflected in FIG. 14.

Since the range capability between DRMs is conservatively estimated to be one mile, concentric circle will be used to divide the Node area into 5 equal width rings. Each adjacent circle radius is increased 1.128 miles so that the outer ring has the designated 5.64 mile radius. These five rings were labeled A through E as reflected on the figure. This establishes the worst case as requiring 5 relays to reach any DRM in the outer E ring.

In order to simplify the process of selecting the path from the center to the outer rings, each ring was divided into sectors. One can see that a binary division was adhered to in progressing to the outer rings. This avoids any ambiguity as to which DRM sector relays a message to the next adjoining ring sector.

When the DRMs are operated as relays, the message carried forward has to carry the entire relay sequence as shown in Table 6 of FIG. 15. When a DRM in the E ring is to be interrogated, the four DRM in the A, B, C and D Rings must be identified by a serial number in sequence, including the return relay sequence. FIG. 15 also shows that 25 bytes of information is included in the A message. Three bytes are required to identify each DRM. The I (information) byte informs the DRM what to do, such as transmit back the recorded power readings or act as a relay and forward the received message. When the E ring DRM is reached and interrogated, it is instructed to send back the recorded power readings. The tabulation shows that 1444 bytes of data must be transferred. The tabulation also shows that a read out of the recorded information in a E ring DRM requires 7337 bytes to be transmitted which will require 9.78 seconds at the transmission baud rate of 6K baud/second.

The same process is followed in interrogating DRMs in the other 4 inner rings with the time to retrieve the power reading information becoming less as each outer ring is completed and removed from the succeeding sequence. A complete compilation of the time to interrogate all the DRMs in the hexagon is shown in Table 7 of FIG. 16. FIG. 16 shows that all the DRMs in a given Hexagon can be read in 55 hours. Since the DRMs in all of the 45 hexagons can be interrogated and read-out in parallel, all of the 1.2 million DRMs can be read-out in 55 hours.

3.2.4 DRM System Software

Figure 17:
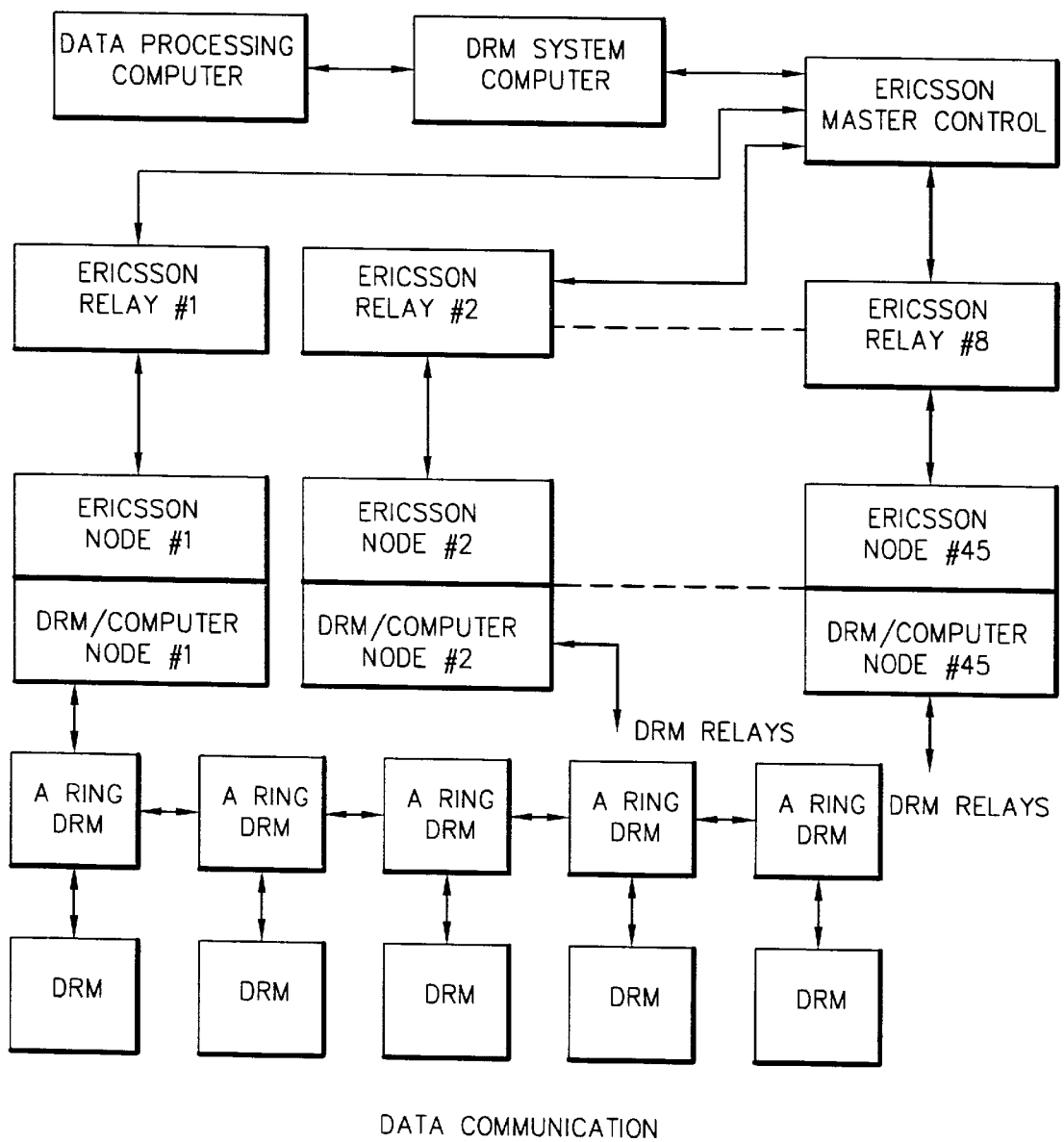
FIG. 17 is a schematic block diagram of data communication transpiring in the system for the demand reporting of electricity consumption by radio in relays to a base station in accordance with the present invention.

The system objective is to read any one or successively read all of the 1.2 million meters located throughout San Diego County. As previously described, this task is accomplished by relaying commands first through the existing Ericsson Communications system and then through DRMs acting as relay transponders. A block diagram of the system is shown in FIG. 17. This diagram shows that a data inquiry is initiated through the Data Processing Computer. The data path extends through the DRM System Computer to the Ericsson Master Control Center to one of Ericsson Relay Stations to one of 45 Ericsson Node transceivers. At the Node, the data is decoded and enters the DRM/Computer. After establishing the route from the Node to the particular DRM being queried, the message continues directly to the DRM or the message is relayed through the ring DRM to the particular DRM being queried. The DRM System Computer has the complete routing record for every DRM and therefore can direct any inquiry to the designated DRM through the established route. Since the RF signal to noise ratio can vary with time, alternate paths are also programmed into the system. Alternate routing can occur between the Ericsson Master Control to a given Node depending on the availability and the reception at the eight Ericsson relay stations. Additional alternate route flexibility is provided between the Node DRM and any particular DRM.

Since the noise level in any given area can change, and the propagation attenuation can also change, the system operation can be significantly improved by providing path flexibility.

3.2.4.1 DRM Relay Description

Each DRM will only respond to an RF inquiry which includes its unique identification number. The range of the RF link is constrained by the topography but is designed to operate reliably to 1 mile. This means that a large number of DRM will be receiving any given DRM transmission but oily the DRM that receives its unique serial number will respond. Also, the interrogation message includes the instruction for the DRM to act as a relay or send back the power readings that have been stored.

Because of the large number of DRMs they will all be identical and interchangeable except for the unique serial number. Any DRM can be placed at any location in the service area so long as the serial number is recorded and tied to the address and/or the customer.

In order to minimize the time to read all the meters in the service area, three different RF frequencies are used. Three frequencies will prevent any two hexagram cell areas from operating on the same frequency and interfering with one another. All the DRM's will have the capability to operate on any one of the three frequencies by setting a switch inside the sealed meter.

During an interrogation cycle, (complete meter read-out including appropriate DRM relay sequence), the relay instructions as well as the identification number of the readout meter, will be carried forward. Each DRM will consequently know how many relay transfers are yet to occur and will therefore know the time required for the return message. If the designated time lapses, the DRM will automatically send an alert message that the communications chain has been broken. The initiator will then know by the serial number of the DRM that flagged the broken chain where in the chain that the communications stopped and will then pick an alternate path to reach the particular designated meter for which a read-out is desired.

In order to reduce the communication through the Ericsson communications system the Node DRM/Computer will have the capability to interrogate and read all the DRMs in the Node area. One instruction from the DRM System Computer will direct the Node to proceed with reading all the DRM in the Node area. This will require the Node Computer to have routing irformation for all of the DRM as well as a program to find an alternate path if for some reason a particular path is not producing acceptable data. The cyclical redundancy check (CRC) in the protocol (described below) will prevent incorrect data from passing through the system.

3.2.5 DRM System Protocol
3.2.5.1 Protocol Development

To ensure that data is transferred correctly, computers use file transfer protocols. These protocols are nothing more than established procedures for data transmission along with the necessary instructions to fully coordinate the process. Initially protocols were very simple, but over the last ten years an evolution has taken place which includes error detection, error correction, matrix interleaving and noise adaptability. The resulting protocols are able to produce error free messages in high noise environments and even with sporadic losses of data.

The protocol evolution has recognized many of the problems in reliable communication and has reacted with many unique improvements to the protocols. While few, if any, are completely satisfied with the present protocols the improvements have provided a significant impact on the consistency and reliability of digital data transmission.

While protocol development for direct connection or telephone data transmission, has been on-going for some time, another equally impressive development evolution was taking place within the amateur radio community. This development began in the late 60's and early 70's and was actually paced by computer availability. In 1977 three new computers were unveiled that could be purchased at a reasonable price. These computers were Commodore Business Machines' PET, Apple Computers Apple II and Radio Shack's TRS-80 Model I. These economical computers allowed amateur enthusiasts to escalate advancements in what was destined to be known as "packet radio".

In this time frame, the Canadian Department of Communications (DOC) authorized a new mode of Amateur Radio Communications called packet radio that utilized the power of the new computers and thus established a mode of operation that revolutionized Amateur Radio.

On Mar. 17, 1980, one and one-half years after Canadian Amateur packet radio was permitted, the FCC established rules that allowed US Amateur Radio operators to participate in packet radio. Unbelievable advancements occurred throughout the 80's, once the FCC opened the door to packet radio. These advancements very quickly established the need for standardization to insure compatibility.

The International Standards Organization (ISO) took on the task of standardizing the communications between computer systems. The results of their efforts has been the formulation of a model, the ISO Open Systems Interconnection Reference Model (OSI-RM), that allows different computer systems to communicate with each other as long as the communication protocols used by the computer systems adhere to the model. This Model consists of a seven-layer hierarchy, with each level permitted to communicate only with immediately adjacent layers.

An Amateur Packet-Radio Link-Layer Protocol, commonly known as AX.25 was approved by the ARRL Board of Directors and has become the basis for all subsequent protocol development. AX.25 specifies the content and format of an amateur packet-radio frame and how that frame is handled at the link layer by packet-radio stations.

The never-ending quest for better and more effective communications in the presence of different types of noise has resulted in a number of new protocols. Each protocol has had some particular advantage over a predecessor but still had some shortcomings. Until very recently, the current protocols fell short of expectations because they failed to make use of modern signal-processing techniques such as forward error correction, data compression and interleaving. Another area that needed attention was adaptability to changing propagation conditions.

Fortunately, the G-TOR protocol has become available, and seems to represent a reasonable compromise between cost and capability. This protocol was designed to provide an improved digital radio communication capability for the HF and VHF bands where noise, interference and fading are inescapable.

The G-TOR protocol was designed to accommodate worldwide communication over propagation paths that may experience interference (QRM), multipath fading, random noise from atmospheric and galactic sources, and burst noise from lightning and other distant man-made and atmospheric sources.

One important feature of the G-TOR protocol is the use of a combination of forward error correction and error detection with Automatic Repeat Request (ARQ). Errors are corrected by the combination of correction and detection with the added advantage that error-correction (parity) bits are not used unless they are needed. The error-detection code transmitted with each frame is a 2-byte cyclic redundancy check (CRC)—the same one used in the popular AX.25 protocol. The CRC code is used to determine if the packet was received correctly before error correction is initiated, and it is also used after error correction has been completed to ensure that the error correction process has successfully removed all errors in the packet.

The central feature of the G-TOR protocol is the Golay forward error correcting code. This code is the extended Golay code which was a (24, 12) binary linear-block code capable of correcting three or fewer errors in a received 24 bit code word. The simplicity and powerful properties of this code make it ideal for the DRM application.

A rare and important property of the Golay 24-12 code is self-duality which makes it invertible. This means that the original data can be recovered by recoding the parity bits. Therefore, if a transmitted frame consists of only parity bits, the original data frame can be recovered at the receiver by recoding the parity frame and this feature is used in the hybrid ARQ procedure.

When burst errors occur due to lightning or interference, the error correcting capability of most error correcting codes is exceeded. Therefore since burst errors are Expected, some protection had to be included in the protocol to help alleviate the resulting errors. The conventional approach to solving this problem is interleaving which was included in the G-TOR protocol. Interleaving is the very last operation performed on the frame before transmission and the first operation performed upon reception. The rearranging of the bits in the frame randomizes long error bursts when the de-interleaving is accomplished.

A Huffman data-compression code is used to remove redundancy from the source data in a way that the original data can be completely recovered or restored. Therefore fewer bits will be traversing the channel to convey any given message. Use of data compression codes will increase data throughput and decrease the required transmission time.

The ARQ concept is commonly used in communications and a part of the G-TOR protocol. An error detection code is used to determine if an error has occurred in the received frame. If the frame is received correctly, a positive reply acknowledgment (ACK) is sent to the sending station. However, if the frame is received in error, the receiving station sends a negative acknowledgment (NAK) to the sending station which prompts a retransmission The theory behind the G-TOR protocol appears to be sound, but solid test results will really validate -he selection of G-TOR for the DRM application. The following table 3.4 shows the impressive results of an extensive test and evaluation:

The history of protocol development indicates that the evolution is not complete and further protocol improvements are a certainty. With the number of disciplines included in the DRM development, it is comforting to find a protocol which appears to fit the need. After reviewing the above information it was decided that the G-TOR protocol would be ideal for the DRM system. Realizing that further improvements would be possible and probable, incorporating the G-TOR protocol was viewed as a way to start operations with a very important known entity.

The G-TOR protocol has been customized for the specific environment to be encountered in the DRM operation. RF communications provide rather unique problems, such as multipath fading, to which hard wire systems are not exposed. A degree of confidence can be gained from knowing the G-TOR protocol has been specifically designed for and tested in this environment.

Kentronics, who developed the G-TOR protocol was contacted to explore the possibility of using this protocol for the DRM system. After conferring with the Kentronics management it was reported that a license to use the G-TOR protocol could be obtained for approximately $3,000. A complete disclosure of the G-TOR protocol program is being prepared for an article scheduled for publication in the QED magazine later this year. It was also established that the assembly language program can be accommodated in the candidate microprocessors being evaluated for the DRM application.

4.0 Products and Services

The product viability of the DRM means providing a product that has an operational life of 15 years and a failure rate of less than 1% per year. Electronic devices can easily achieve this stringent operational requirement. The DRM will be designed with proper derating and overall conservatism to guarantee the prescribed long life, target costs and performance.

The Demand Meter Relay will provide a capability price combination that heretofore has never been available. While making new products and services available to the consumer, it also reduces meter reading to a simple, efficient, automated process. This section will highlight the new capabilities that will be added to electric utility's current products and services.

4.1 Meter Sales

Volume production will reduce the price of the Demand Relay Meter. The reduced price will improve demand, which will increase production volume. The target price for the DRM approaches current electromechanical meters and includes new capabilities. It is important to understand that, although there is stiff competition between manufacturers of the existing electromechanical meters, there is currently no other alternative to the electromechanical meter. As there is essentially no competition in the solid-state RF meter market, the DRM will have a near monopoly in this niche. Therefore, the pricing strategy may be to maximize profits rather than achieve market penetration, sliding the price downward only when competition enters the niche. Maintaining the price relatively high will allow the utility to recoup non-recurring development costs more quickly. The compromise will be to set a price high enough to maximize profits, but low enough to maintain sufficient volume and the closely related competitive manufacturing cost.

4.2 Reliability

Government funded development to support military systems has had a unparalleled influence on electronic hardware. The impact has provided components with greater performance capability in very hostile environments while the size, weight, and cost have all come down. Electronics continues to be unique in providing an inverse relationship between performance and cost. Anyone that has purchased a computer in the last 5 years can attest to the fact within weeks after a purchase, a much faster computer with more memory is available at a lower price. This process allows electronic designs to be used in ever expanding applications where electronics were never considered as a prospect. Examples are automotive ignition and anti-skid brakes. Before the turn of the century the utility power meter will be on the list of essentially electronics products. So the question is not how, where or when but who will capture this very large product market.

Years ago mechanical watches kept time poorly, required calibration and repair, and needed winding to operate when electronic watches arrived on the market they were relatively expensive and unreliable. Today, time pieces of all types are principally electronic, less expensive, provide incredible functions, and are almost indestructible. Electronic pagers are another market that has reduced prices while improving functions. Similar technology is now being employed in Electronic Digital Assistants (EDAs), such as the Apple Newton and Casio Zoomer. Using spread-spectrum RF transmission, EDAs can send and receive messages, link to bulletin boards, or access the Internet. Lessons learned from the time-piece market as well as electronic pagers and EDAs will provide technologies vastly superior to electromechanical meters in both function and reliability.

4.3 Added Capability

The DRM has two basic innovations that make it highly attractive to the utility market. These two features are built-in RF communications and TOU. There are additional ancillary features that are easily added to accommodate revenue protection. The ancillary features however, are only possible in conjunction with the other main innovations.

Two Way RF Communications and TOU advantages to the utility industry are: 1) remote meter reading, 2) remote switching, 3) load control, 4) time of day rates, 5) interruptible or curtailable rates, 6) new billing techniques or pre-pay security, 7) profile information stored, 8) computes information important to consumer, 9) stores ID code and other access control codes, 10) measures power factor, 11) provides instantaneous communications with customers, and 12) informs consumer about performance and costs.

4.4 Revenue Protection (Theft Avoidance)

In conflict with the desire and effort invested in attempting to quantify the theft element in public utilities, there does not appear to be a single unqualified answer. There is an abundance of opinions from very reputable sources, but the opinions are not rigorously backed up with data and are not completely in agreement. The good or bad news is that the number is not small. The PUC has announced that theft is approximately 5% of gross revenue. The Justice Department believes theft to be 2% of gross revenue. Finally, utilities that have had some success in revenue protection feel that their exposure has been reduced to less than 1%.

Even the utilities that have achieved a degree of success have resorted to reasonably rudimentary and costly techniques. These techniques and theft detecting equipment include the following: 1) film cameras, 2) video camera, 3) manual surveillance, and 4) redundant power meters.

Techniques and equipment that have been identified and discussed but apparently have not yet been utilized include: 1) disconnect detectors and alarms, 2) seismic detectors and alarm magnetic field detectors and alarm, 3) near real time readout meters, 4) TOU backup meters, and 5) system wide backup monitoring, and 6) 10 sec/frame automatic cameras.

All of the above items currently exist in one form or another, but as yet, have not been assimilated into proven products adapted for the utility market. It is also apparent that detectors and alarms are not stand alone items and must be incorporated into existing products to be effective in theft applications.

Revenue protection or theft detection is unfortunately not a one time definable quantity. It is analogous to the military's never ending measure and countermeasure development cycle. New products are always required as the adversary becomes familiar with existing techniques and devices. Another good example is the continuing process of changing paper currency to discourage counterfeiting.

A nominal allowance for development in revenue protection can be a prudent investment compared to the mounting revenue losses attributed to theft. It is anticipated that many, if not all, of the existing methods to circumvent the payment for power used will be eliminated or significantly reduced with the advent of near real-time monitoring and detection. This will probably be followed by information flow tampering and utilities should be aware of the possibilities and have suitable counter measures defined and ready, if and when this future possibility arises.

The present techniques for theft are so basic, rudimentary or obvious that they border on embarrassing. An example of such a techniques is simply to turn the meter over and plug it in upside down. The meters currently being used were very conveniently designed so they can be inverted, still provide power and run backwards. Having inverted their meter, an enterprising thief can run every appliance he has with the result being that the more power he uses the faster the total used will be reduced. Anther very common technique is to drill a small innocuous hole in the glass or Lexan cover and jam the turning wheel with a small wire.

Without being considered condescending or critical it should be appreciated that the methods used to apprehend the culprits in the above examples are equally basic, rudimentary and obvious. Meter readers schedules are arbitrarily changed with the hope of catching someone with their meter upside down. Also meter readers are trained to look for small holes in the meter covers. With the technology available today these techniques and countermeasures should and will shortly become history.

Attributes for future power meters that should be evaluated with respect to being cost effective should include the following: 1) shock resistant meter construction including solid encapsulation (throw away module) construction and a shatterproof display window, 2) excessive magnetic field detector, 3) jar or seismic detector, 4) disconnect detector, 5) opaque cover to prevent uv memory erasing, 6) immediate tamper alarm through rf link, 7) remote meter with fake meter display, 8) Mu metal shield for magnetic field protection, 9) sonic alarm set-off by tamper detectors, and/or 10) unique police pagers which would alert patrolmen of theft in progress.

A cursory review indicates that most of the above features could be incorporated into the DRM at a nominal cost, with the possible exception of the Mu metal shield for magnetic field protection. Using a magnetic field detector might be considered a viable alternate.

The utilization of police pagers to alert a patrolman, in the vicinity of the tampering in progress, is more of a utilization of existing capabilities along with the near real-time DRM implementation. The logistics and processes required to accomplish an apprehension would require a combined utility and police effort yet to be explored and defined.

In accordance with the preceding explanation, variations and adaptations of a system for demand reporting of electricity consumption by radio in relays to a base station, and demand relay wattmeters so reporting over a wide area, in accordance with the present invention will suggest themselves to a practitioner of the electronic communication system design arts.

In accordance with these and other possible variations and adaptations of the present invention, the scope of the invention should be determined in accordance with the following claims, only, and not solely in accordance with that embodiment within which the invention has been taught.

What is claimed is:

1. A communications method where a great multiplicity of geographically-distributed monitors of the use of electricity report the amounts and times of use of the electricity by radio upon and responsively to successive demands originating from an associated one of a plurality of regional central stations, the communications method comprising:

assigning to each of the great multiplicity of geographically-distributed monitors of the use of electricity a unique identification, to which unique identification each monitor will uniquely respond when addressed by radio of an appropriate frequency;

classifying each of a multiplicity of geographically-distributed monitors out of the great multiplicity of monitors to be within a particular one geographical zone out of a plurality of such zones, each of which zones is geographically adjacent to no more than six other zones and each of which zones has a regional central station, the monitors of each geographical zone responding to radio only of a particular frequency out of a plurality of radio frequencies;

wherein only three different radio frequencies need be used to preclude that the monitors of any one zone will not respond to the radio frequency of any adjacent zone;

addressing from the regional central station of each zone, in sequence and upon successive known times, each of the multiplicity of the geographically-distributed monitors within that zone by sending at a one of the plurality of radio frequencies a demand message string including a unique address of each of any number of selected geographically intervening monitors as do, in total, provide a outward communications relay path from the regional central station to a terminus monitor within the zone, a command to each such outward-relay-path monitor so informing it that it is intervening in the outward communications relay path and that, so being, it is not presently the terminus monitor, a unique address of a one monitor that is presently the terminus monitor, a command to this monitor informing it that it is presently the terminus monitor, a unique address of each of any number of selected geographically intervening monitors as do, in total, provide a inward communications relay path from the terminus monitor back to the zone's regional central station, and a command to each such inward-relay-path monitor so informing it that it is intervening in the inward communications relay path and, so being, that it is not presently the terminus monitor, wherein the time of the transmission of said demand message string, which time is known to the regional central station, is inherent in the act of transmitting said demand message string;

responding, successively in each of the outward-relay-path monitors of each zone upon occasion of being addressed in sequence and upon successive times, to remove its own unique address from the demand message string, and to retransmit at the same frequency as received the demand message string so abbreviated to successive outward-relay-path monitors within the zone until an abbreviated demand message string including relayed commands, an address of the terminus monitor and addresses of inward-relay-path monitors reaches the terminus monitor;

responding in the terminus monitor to remove its own address from the demand message string, and to retransmit at the same frequency as received the relayed abbreviated demand message string, including commands and addresses of inward-relay-path monitors, now in accompaniment to data regarding the amount and time of usage of electricity, which amount and time of usage data is relational to the time of receipt of the demand message string; and responding, successively in each of the inward-relay-path monitors of each zone upon occasions of being addressed in sequence and upon successive times, to remove its own unique address from the abbreviated demand message string, and to retransmit at the same frequency as received the demand message string so abbreviated and accompanying data to successive inward-relay-path monitors within the zone until the data reaches the regional central station of the zone;

wherein the central station of each zone retrieves the data responsively to its own demand from the addressed terminus monitor of the same zone through a succession of radio relays both outward from the central station through intervening monitors of the zone to the terminus monitor, and also inward from the terminus monitor back through intervening monitors of the zone to the central station;

wherein, by successive interrogations upon successive times, each central station ultimately receives via radio of a particular one of the plurality of frequencies both the amount and time of usage of electricity usage as is monitored by the multiplicity of geographically-distributed monitors within its own zone, and is able to interpret said amount and said time of usage relative to the known time at which it did transmit the demand message string.

2. A communications system for reporting by radio from each of a great multiplicity of geographically-distributed monitors, upon and responsively to successive demands originating from an associated one of a plurality of regional central stations at times controlled by and known to each regional central station, a local amount and time of use of electricity, the communications system comprising:

a great multiplicity of geographically-distributed monitors of the use of electricity each of which has a unique identification, to which unique identification each monitor will uniquely respond when addressed by radio of an appropriate frequency;

each of the great multiplicity of geographically-distributed monitors being classified and identified to be within a particular geographical zone of a plurality of such zones, each of which zones is geographically adjacent to more than six other zones and each of which zones has a regional central station;

a plurality of regional central station, each addressing in sequence and upon successive times that are controlled by and known to itself, each of an associated multiplicity of the geographically distributed monitors by sending by radio of an associated frequency a demand message string including a unique address of each of any number of selected geographically intervening monitors as do, in total, provide a outward communications radio relay path from the regional central station to a terminus monitor, a command to each such outward-relay-path monitor so informing it that it is intervening in the outward communications relay path and that, so being, it is not presently the terminus monitor, a unique address of a one monitor that is presently the terminus monitor, a command to this monitor informing it that it is presently the terminus monitor, a unique address of each of any number of selected geographically intervening monitors as do, in total, provide a inward communications relay path from the terminus monitor back to the regional central station, and a command to each such inward-relay-path monitor so informing it that it is intervening in the inward communications relay path and, so being, that it is not presently the terminus monitor, wherein each terminus monitor receives a demand message string addressed to itself at a time that is controlled by and known to the regional central station;

logic means in each of the great multiplicity of monitors for responding, successively upon occasion of being addressed by radio of appropriate frequency in sequence and upon successive times, for removing its own unique address from the demand message string, and for retransmitting at the same frequency as received the demand message string so abbreviated to successive outward-relay-path monitors until (1) an abbreviated demand message string including relayed commands, (ii) an address of the terminus monitor and (iii) addresses of inward-relay-path monitors reaches the terminus monitor;

the logic means further functioning in each terminus monitor one of the great multiplicity of monitors responding to (i) remove its own address from the demand message string, and to (ii) retransmit at the same frequency as received the relayed abbreviated demand message string including commands and addresses of inward-relay-path monitors, now in accompaniment to data regarding the amount and time of usage of electricity, which amount and time of usage data is relational to the time of receipt of the demand message string; and the logic means further functioning successively in each of the inward-relay-path monitors upon being addressed in sequence and upon successive times, to remove its own unique address from the abbreviated demand message string, and to retransmit at the same frequency as received the demand message string so abbreviated and accompanying data to successive inward-relay-path monitors until the data reaches the regional central station;

wherein each central station retrieves the data responsively to its own demand from the addressed terminis monitor through a succession of radio relays both outward from the central station through intervening monitors to the terminus monitor, and also inward from the terminus monitor back through intervening monitors to the central station;

wherein, by successive interrogations upon successive times, each central station ultimately receives via radio the electricity usage and time of usage as is monitored by the associated multiplicity of geographically-distributed monitors, and is able to interpret amounts and times of usage of electricity relative to those known times at which it did transmit the demand message strings and therein correlate the time of usage data with real time.

3. A communications method for reporting by radio from each of a great multiplicity of resource usage monitors a local use and time of use of a distributed resource upon the occasions of, and responsively to, demands originating from a regionally associated one of a plurality of central monitoring stations, the communications method comprising;

transmitting by radio from each one of the plurality of central monitoring stations, at times controlled by and known to itself, and at a radio frequency associated with each transmitting central monitoring station and not in use for transmitting by any next adjacent central monitoring station, and in sequence and upon successive times, a demand message string to each of a multiplicity of geographically-distributed uniquely-identified resource usage monitors that are associated with each central station, the demand message string including a unique address of each of any number of selected usage monitors as, in total, are intervening in providing a outward communications relay path from the transmitting regional monitoring station to a terminus resource usage monitor, a command to each such outward-relay-path usage monitor so informing it that it is intervening in the outward communications relay path and that, so being, it is not presently the terminus resource usage monitor;

a unique address of a one resource usage monitor that is presently the terminus resource usage monitor, a command to this resource usage monitor informing it that it is presently the terminus resource usage monitor, a unique address of each of any number of selected resource usage monitors as, in total, are intervening in a inward communications relay path from the terminus resource usage monitor back to the regional monitoring station, and a command to each such inward-relay-path resource usage monitor so informing it that it is intervening in the inward communications relay path and, so being, that it is not presently the terminus resource usage monitor;

responding, successively in each of the outward-relay-path resource usage monitors upon occasion of being addressed in sequence and upon successive times, to remove its own unique address from the demand message string, and to retransmit by radio at the same frequency as received the demand message string so abbreviated to successive outward-relay-path resource usage monitors until (i) an abbreviated demand message string including relayed commands, (ii) an address of the terminus resource usage monitor and (iii) addresses of inward-relay-path resource usage monitors, all reach the terminus monitor;

responding in the uniquely-addressed terminus resource usage monitor to remove its own address from the demand message string, and to retransmit by radio at the same frequency as received the relayed abbreviated demand message string, including commands and addresses of inward-relay-path resource usage monitors, now in accompaniment to data regarding local use and time of use of distributed resource, said time of use being current to time of receipt of the demand message string which time is under control of, and known to, the transmitting central monitoring station; and responding, successively in each of the inward-relay-path resource usage monitors upon being addressed in sequence and upon successive times, to remove its own unique address from the abbreviated demand message string, and to retransmit by radio at the same frequency as received the demand message string so abbreviated and accompanying data to successive inward-relay-path resource usage monitors until the local use and time of use data from the terminus resource usage monitor reaches the regional central monitoring station;

wherein time of use data, in particular, from each terminus resource monitor is relative to the known times at which the central monitoring station does communicate by radio with each of the multiplicity of resource monitors.

4. An electricity time of use communications system for reporting by radio from each of a great multiplicity of geographically-distributed monitors of the amount and of the time of usage of electricity, the electricity time of use communications system comprising:

a great multiplicity of geographically-distributed monitors of amounts, and of usages per time periods, of electricity, no monitor of necessity knowing of any of the time of day nor the day of week and month and year, each of which monitors has a unique identification, divided into a plurality of geographically-adjoining groups each of which groups contains a multiplicity of monitors, no more than six groups adjoining any one group;

a central monitoring station within each of the plurality of groups which central monitoring station communicates by radio relay at times of day and of week and month and year that are of its own choosing and known to itself, with the multiplicity of monitors within the associated group, the frequency of radio communication within each group being different from the frequency of radio communication of each adjoining group, making that at most three different frequencies need be used for all groups; and a multiplicity of uniquely-identified monitors within each group which monitors both (i) relay by radio information to and from the central monitoring station of the group, and each which monitors, when individually addressed in accordance with its unique identification, (ii) reports by radio relay to the central monitoring station information regarding the local amount, and time of usage, of electricity;

wherein the central monitoring station, knowing the time of day and day of week and month and year that it did request information from each uniquely-identified monitor, is capable of interpreting received information regarding the local amount, and time of usage, of electricity as information regarding the amount of electricity usage per time of day and week and month and year.

5. A communications system for addressably communicating, at least in part by radio, with each individual one of a great multiplicity of monitors of the usage of electricity per periods, the multiplicity of monitors being distributed over a geographical area, the communications system comprising:

a great multiplicity of uniquely-identified geographically-distributed radio-communicating monitors divided into a multiplicity of geographically-adjoining groups each of which groups contains a multiplicity of monitors, no more than six groups adjoining any one group in a tessellation of the geographical area, the multiplicity of monitors within each group being both (i) individually addressable by radio each in accordance with its unique identification, (ii) to report by radio, at a one or more radio frequencies that are both different from all radio frequencies of each adjoining group and insufficiently strong so as to interfere with radio communications transpiring within non-adjoining groups, making that at most three different frequencies or groups of frequencies need be used for and between all groups;

a central monitoring station within each of the multiplicity of groups, each central monitoring station sequentially addressing by radio at known times of its sole choice each of the multiplicity of monitors within the associated group, so as to sequentially receive by radio data regarding the use of electricity per periods from each of the each of the addressed monitors at the times that each said monitor is addressed, and further communicating received monitor-specific data to a headquarters station; and a headquarters station, communicating in parallel with each of the central monitoring stations within each of the multiplicity of groups in order to direct the sequential addressing of monitors within the associated group transpiring concurrently at each of the central monitoring stations, and to receive the monitor-specific data from the great multiplicity of monitors each via the central monitoring stations of its associated group, the central monitoring stations of the multiplicity of groups communicating with the headquarters station concurrently, and in parallel;

wherein radio communication to, and from, the great multiplicity of monitors is transpiring in parallel within the geographical area, and so is communication between the headquarters station and the multiplicity of central monitoring stations;

wherein the central monitoring stations are capable of interpreting, in consideration of the known times at which communications were made to each monitor, the communicated usages of electricity per periods from each monitor, and from many monitors in parallel, so as to thereby produce composite time of day and of week and month and year information that is supportive of, inter alia, electrical generation planning and load leveling.

6. The communications system according to claim 5 wherein the interrogating by radio of each individual one of the great multiplicity of monitors distributed over a geographical area is by radio relay, each of the great multiplicity of uniquely-identified geographically-distributed radio-communicating monitors serving, as addressing of any one monitor dictates, to radio link communication of both an address of a selected monitor, and any data broadcast by the selected monitor responsive to its being addressed;

wherein radio communication is had by relay with monitors of a group even beyond the radio communication distance of the central relay station of the group;

wherein, because radio communication even by relay is quick relative to a continuous consumption of electricity, the capacity of the central monitoring stations to interpret time of electricity usage at the monitors, and the collective monitors, is not diminished.

7. The communications system according to claim 5 wherein only one radio frequency is used for radio communications, bi-directionally between the central station of a group and all the multiplicity of monitors of the associated group, within each group.

8. The communications system according to claim 5 wherein the central monitoring stations and the headquarters station bi-directionally communicate by radio relay at one or more radio frequencies non-conflicting with the radio frequencies simultaneously in use for communications between the multiplicity of central stations and great multiplicity of monitors.

9. The communications system according to claim 5, wherein the central monitoring stations and the headquarters station bi-directionally communicate by land line.

10. A method of communicating, in part by radio, with each individual one of a great multiplicity of monitors of the usage, and usage per period, of electricity, that are distributed over a geographical area, the communications method comprising:

dividing the great multiplicity of uniquely-identified geographically-distributed radio-communicating electricity-usage-monitoring and electricity-usage-per-period monitors into a multiplicity of geographically-adjoining groups in a tessellation of the geographical area, each of which groups contains a multiplicity of monitors, and where no more than six groups adjoin any one group;

individually sequentially communicatively addressing by radio from a central monitoring station each of the monitors within each group at times under control of the central monitoring station and in accordance with a unique identification of the monitor, and, responsively to the communicative addressing, sequentially receiving by radio at the central monitoring station data from each addressed monitor;

wherein a radio frequency used in any one group is both (i) different from all radio frequencies of any adjoining groups, and (ii) non-interfering with radio communications transpiring within non-adjoining groups;

wherein at most three different frequencies are mandated to be used for and between all groups; and further communicating in parallel from a headquarters station (i) with each of the central monitoring stations within each of the multiplicity of groups, so as to (ii) receive monitor-specific data from each of the central monitors;

wherein the communicating between the headquarters station and the multiplicity of monitors as are within the multiplicity of groups, and also the radio communicating between the central station and the multiplicity of monitors of the associated group, is all in parallel so that, by this parallelism, a multiplicity of communications links, at least partially implemented by radio, may be realized per unit time; and wherein, because it knows when it did communicate with each monitor, the central monitoring stations is able to interpret the time periods of electricity usage at each monitors, and of the monitors collectively, as the electricity usage per time of day and week and month and year.

* * * * *